US012720047B2

(12) United States Patent
Paluri et al.

(10) Patent No.: US 12,720,047 B2
(45) **Date of Patent: *Aug. 25, 2026**

(54) METHOD FOR SIGNALING DEBLOCKING FILTER PARAMETER INFORMATION IN VIDEO OR IMAGE CODING SYSTEM

(71) Applicant: LG ELECTRONICS INC., Seoul (KR)

(72) Inventors: Seethal Paluri, Seoul (KR); Hendry Hendry, Seoul (KR); Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/933,411

(22) Filed: Oct. 31, 2024

(65) Prior Publication Data

US 2025/0063164 A1 Feb. 20, 2025

Related U.S. Application Data

(63) Continuation of application No. 17/949,013, filed on Sep. 20, 2022, now Pat. No. 12,200,208, which is a continuation of application No. PCT/KR2021/003591, filed on Mar. 23, 2021.

(60) Provisional application No. 62/993,656, filed on Mar. 23, 2020.

(51) Int. Cl.
*H04N 19/117* (2014.01)
*H04N 19/172* (2014.01)
*H04N 19/46* (2014.01)
*H04N 19/70* (2014.01)
*H04N 19/82* (2014.01)

(52) U.S. Cl.
CPC ......... *H04N 19/117* (2014.11); *H04N 19/172* (2014.11); *H04N 19/46* (2014.11); *H04N 19/70* (2014.11); *H04N 19/82* (2014.11)

(58) Field of Classification Search
None
See application file for complete search history.

(56) References Cited

U.S. PATENT DOCUMENTS 11,863,781 B2 * 1/2024 Wang ..................... H04N 19/50
12,231,692 B2 * 2/2025 Deshpande .......... H04N 19/124
2019/0306502 A1 * 10/2019 Gadde .................. H04N 19/117
2022/0286685 A1 * 9/2022 Hendry .................. H04N 19/82

OTHER PUBLICATIONS

Benjamin Bross, "Versatile Video Coding (Draft 8)," JVET of ITU-T SG 16 WP 3 and ISO/IEC JTC 1/SC 29/WG 11, JVET-Q2001-vC, Jan. 7-17, 2020, pp. 1-508.

* cited by examiner

*Primary Examiner* — Jessica M Prince
(74) *Attorney, Agent, or Firm* — Bryan Cave Leighton Paisner LLP

(57) ABSTRACT

A method by which a decoding device decodes an image, according to the present document, comprises the steps of: obtaining image information from a bitstream; generating a reconstructed picture of the current picture; deriving deblocking filter parameter information related to deblocking filter parameters on the basis of the image information; and performing deblocking filtering on the reconstructed picture on the basis of the deblocking filter parameters so as to generate a modified reconstructed picture.

3 Claims, 16 Drawing Sheets

FIG. 10 deblocking_filter_control_present_flag

1 pps_deblocking_filter_disabled_flag

0 deblocking applied using default values set which are all equal to 0

1 deblocking_filter_override_enabled_flag

Figure 10:
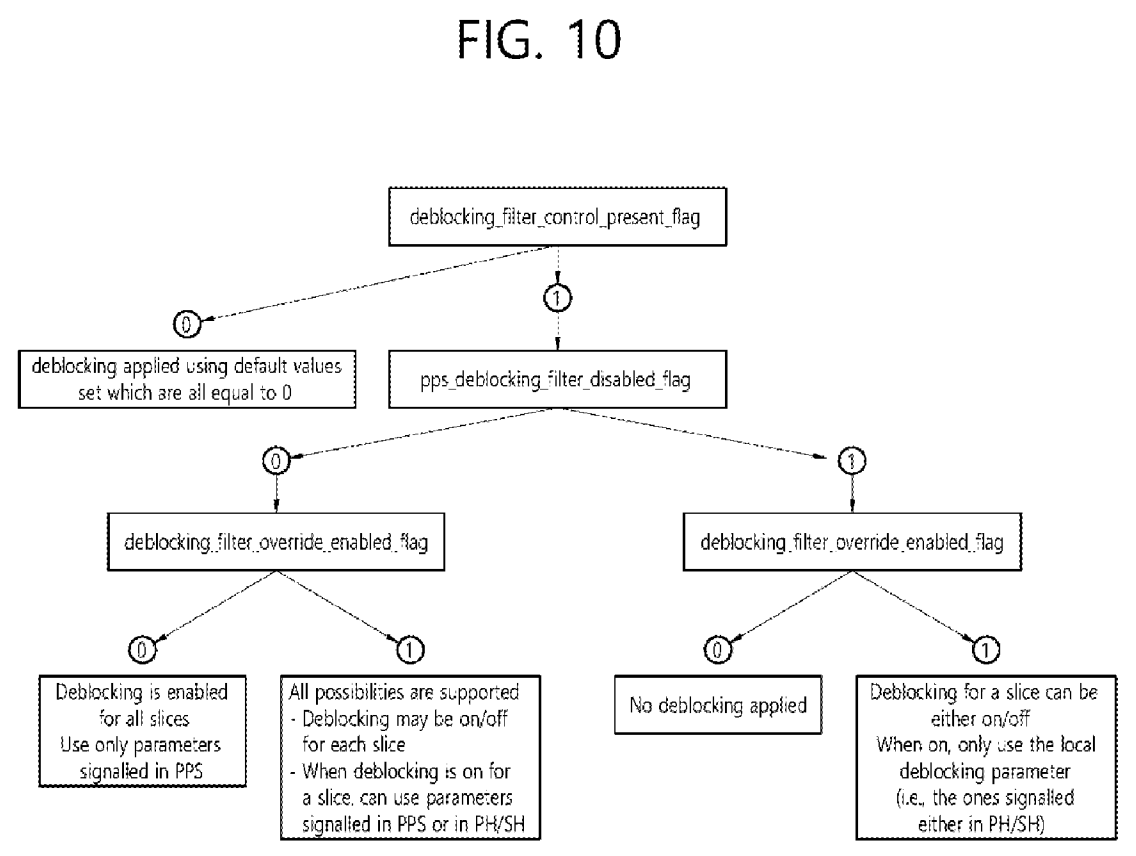

0

No deblocking applied

1

Deblocking for a slice can be either on/off
When on, only use the local deblocking parameter
(i.e., the ones signalled either in PH/SH)

0 deblocking_filter_override_enabled_flag

0

Deblocking is enabled for all slices
Use only parameters signalled in PPS

1

All possibilities are supported
- Deblocking may be on/off for each slice
- When deblocking is on for a slice, can use parameters signalled in PPS or in PH/SH

METHOD FOR SIGNALING DEBLOCKING FILTER PARAMETER INFORMATION IN VIDEO OR IMAGE CODING SYSTEM

CROSS-REFERENCE TO RELATED APPLICATIONS

This application is a Continuation Application of U.S. patent application Ser. No. 17/949,013, Sep. 20, 2022, which is a Continuation Application of International Application No. PCT/KR2021/003591, filed on Mar. 23, 2021, which claims the benefit of U.S. Provisional Application No. 62/993,656, filed on Mar. 23, 2020, the contents of which are all hereby incorporated by reference herein in their entirety.

BACKGROUND OF THE DISCLOSURE

Field of the Disclosure

The present disclosure relates to video or image coding technology and, more particularly, to a method for signaling deblocking filter parameter information in a video or image coding system.

Related Art

The demands for high-resolution and high-quality images and video, such as an ultra-high definition (UHD) image and video of 4K or 8K or more, are recently increasing in various fields. As image and video data become high resolution and high quality, the amount of information or the number of bits that is relatively transmitted is increased compared to the existing image and video data. Accordingly, if image data is transmitted using a medium, such as the existing wired or wireless wideband line, or image and video data are stored using the existing storage medium, transmission costs and storage costs are increased.

Furthermore, interests and demands for immersive media, such as virtual reality (VR), artificial reality (AR) content or a hologram, are recently increasing. The broadcasting of an image and video having image characteristics different from those of real images, such as game images, is increasing.

Accordingly, there is a need for a high-efficiency image and video compression technology in order to effectively compress and transmit or store and playback information of high-resolution and high-quality images and video having such various characteristics.

SUMMARY OF THE DISCLOSURE

Technical Objects

One embodiment of the present disclosure may provide a method and an apparatus for improving video/image coding efficiency.

One embodiment of the present disclosure may provide a method and an apparatus for improving video/image quality.

One embodiment of the present disclosure may provide a method and an apparatus for efficiently signaling deblocking filter parameter information.

Technical Solutions

According to one embodiment of the present disclosure, a video/image decoding method performed by a decoding apparatus is provided. The method may comprise obtaining image information from a bitstream, generating a reconstructed picture of a current picture, deriving deblocking filter parameter information related to deblocking filter parameters based on the image information, and generating a modified reconstructed picture by performing deblocking filtering on the reconstructed picture based on the deblocking filter parameters, wherein the image information may include a sequence parameter set (SPS), a picture parameter set (PPS), a picture header (PH), and a slice header (SH); at least one of the PPS or the SPS includes first flag information indicating whether the deblocking filtering is enabled and second flag information related to whether first deblocking filter parameter information exists in at least one of the PPS or the SPS; and the deblocking filter parameters may be derived based on the first flag information and the second flag information.

According to one embodiment of the present disclosure, a decoding apparatus for performing video/image decoding is provided. The apparatus may comprise an entropy decoder obtaining image information from a bitstream, an adder generating a reconstructed picture of the current picture, and a filter deriving deblocking filter parameter information related to deblocking filter parameters based on the image information and generating a modified reconstructed picture by performing deblocking filtering on the reconstructed picture based on the deblocking filter parameters, wherein the image information may include a sequence parameter set (SPS), a picture parameter set (PPS), a picture header (PH), and a slice header (SH); at least one of the PPS or the SPS includes first flag information indicating whether the deblocking filtering is enabled and second flag information related to whether first deblocking filter parameter information exists in at least one of the PPS or the SPS; and the deblocking filter parameters may be derived based on the first flag information and the second flag information.

According to one embodiment of the present disclosure, a video/image encoding method performed by an encoding apparatus is provided. The method may comprise generating a reconstructed picture of a current picture, deriving deblocking filter parameter information related to deblocking filter parameters for the reconstructed picture, generating a modified reconstructed picture by performing deblocking filtering on the reconstructed picture based on the deblocking filter parameters, and encoding image information including the deblocking filter parameter information, wherein the image information may include a sequence parameter set (SPS), a picture parameter set (PPS), a picture header (PH), and a slice header (SH); at least one of the PPS or the SPS includes first flag information indicating whether the deblocking filtering is enabled and second flag information related to whether first deblocking filter parameter information exists in at least one of the PPS or the SPS; and the deblocking filter parameters may be derived based on the first flag information and the second flag information.

According to one embodiment of the present disclosure, an encoding apparatus for performing video/image encoding is provided. The apparatus may comprise an adder generating a reconstructed picture of a current picture, a filter deriving deblocking filter parameter information related to deblocking filter parameters for the reconstructed picture and generating a modified reconstructed picture by performing deblocking filtering on the reconstructed picture based on the deblocking filter parameters, and an entropy encoder encoding image information including the deblocking filter parameter information, wherein the image information may include a sequence parameter set (SPS), a picture parameter set (PPS), a picture header (PH), and a slice header (SH); at least one of the PPS or the SPS includes first flag information indicating whether the deblocking filtering is enabled and second flag information related to whether first deblocking filter parameter information exists in at least one of the PPS or the SPS; and the deblocking filter parameters may be derived based on the first flag information and the second flag information.

According to one embodiment of the present disclosure, there is provided a computer-readable digital storage medium in which encoded video/image information generated according to the video/image encoding method disclosed in at least one of the embodiments of the present disclosure is stored.

According to an embodiment of the present disclosure, there is provided a computer-readable digital storage medium in which encoded information or encoded video/image information causing the decoding apparatus to perform the video/image decoding method disclosed in at least one of the embodiments of the present disclosure is stored.

Effects of the Disclosure

According to one embodiment of the present disclosure, the overall video/image coding efficiency may be improved.

According to one embodiment of the present disclosure, video/image quality may be improved.

According to one embodiment of the present disclosure, signaling of deblocking filter parameter information may be performed efficiently by efficiently arranging syntax elements based on a syntax structure related to deblocking filtering.

The technical effects of the present disclosure are not limited to the technical effects described above, and other technical effects not mentioned herein may be clearly understood by those skilled in the art to which the present disclosure belongs from the descriptions of the appended claims.

BRIEF DESCRIPTION OF THE DRAWINGS

FIG. 10 illustrates a conventional deblocking filtering process.

DESCRIPTION OF EXEMPLARY EMBODIMENTS

Figure 1:
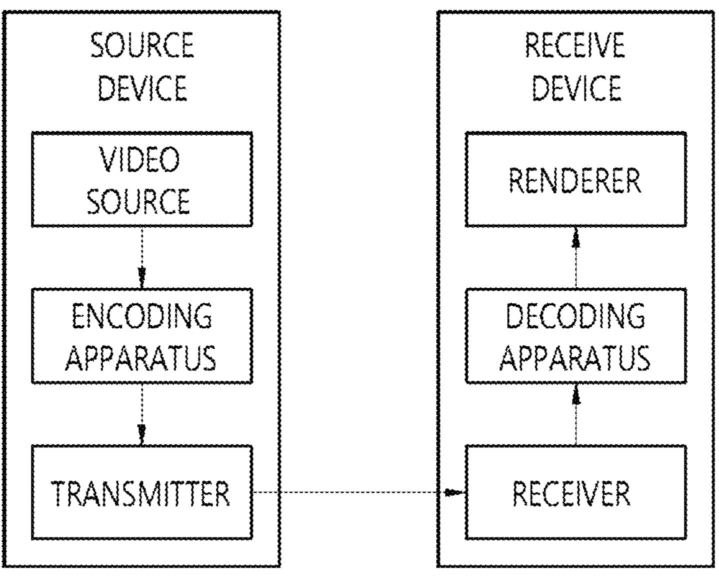
FIG. 1 schematically shows an example of a video/image coding system applicable to embodiments of the present disclosure.

This document may be modified in various ways and may have various embodiments, and specific embodiments will be illustrated in the drawings and described in detail. However, this does not intend to limit this document to the specific embodiments. Terms commonly used in this specification are used to describe a specific embodiment and is not used to limit the technical spirit of this document. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in this document are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of this document unless it deviates from the essence of this document.

Hereinafter, preferred embodiments of this document are described more specifically with reference to the accompanying drawings. Hereinafter, in the drawings, the same reference numeral is used in the same element, and a redundant description of the same element may be omitted.

FIG. 1 schematically illustrates an example of a video/image coding system to which embodiments of this document may be applied.

Referring to FIG. 1, a video/image coding system may include a first device (a source device) and a second device (a receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, the methods/embodiments disclosed in this document may be applied to a method disclosed in the versatile video coding (VVC). Further, the methods/embodiments disclosed in this document may be applied to a method disclosed in the essential video coding (EVC) standard, the AOMedia Video 1 (AV1) standard, the 2nd generation of audio video coding standard (AVS2), or the next generation video/image coding standard (ex. H.267 or H.268, etc.).

The present disclosure provides various embodiments related to video/image coding, and unless otherwise explicitly stated, the embodiments may be performed in combination with each other.

In the present disclosure, a video may refer to a set of a series of images according to the passage of time. A picture generally refers to a unit representing one image in a specific time period, and a slice/tile is a unit constituting a portion of a picture in terms of coding. A slice/tile may include one or more coding tree units (CTUs). One picture may consist of one or more slices/tiles. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of complete tiles or an integer number of consecutive complete CTU rows within a tile of a picture that may be exclusively contained in a single NAL unit.

Meanwhile, one picture may be divided into two or more subpictures. A subpicture may be a rectangular region of one or more slices within a picture.

A pixel or a pel may mean the smallest unit constituting one picture (or image). Also, 'sample' may be used as a term corresponding to the pixel. A sample may generally represent a pixel or a value of a pixel and may represent only a pixel/pixel value of the luma component or only a pixel/pixel value of the chroma component.

A unit may represent a basic unit of image processing. The unit may include at least one of a specific region of the picture and information related to the region. One unit may include one luma block and two chroma (e.g., cb, cr) blocks. The unit may be used interchangeably with terms such as block or area in some cases. In a general case, an M×N block may include samples (or sample arrays) or a set (or array) of transform coefficients of M columns and N rows.

In this document, the term "A or B" may mean "only A", "only B", or "both A and B". In other words, in this document, the term "A or B" may be interpreted to indicate "A and/or B". For example, in this document, the term "A, B or C" may mean "only A", "only B", "only C", or "any combination of A, B and C".

A slash "/" or a comma used in this document may mean "and/or". For example, "A/B" may mean "A and/or B". Accordingly, "A/B" may mean "only A", "only B", or "both A and B". For example, "A, B, C" may mean "A, B or C".

In this document, "at least one of A and B" may mean "only A", "only B", or "both A and B". Further, in this document, the expression "at least one of A or B" or "at least one of A and/or B" may be interpreted the same as "at least one of A and B".

Further, in this document, "at least one of A, B and C" may mean "only A", "only B", "only C", or "any combination of A, B and C". Further, "at least one of A, B or C" or "at least one of A, B and/or C" may mean "at least one of A, B and C".

Further, the parentheses used in this document may mean "for example". Specifically, in the case that "prediction (intra prediction)" is expressed, it may be indicated that "intra prediction" is proposed as an example of "prediction". In other words, the term "prediction" in this document is not limited to "intra prediction", and it may be indicated that "intra prediction" is proposed as an example of "prediction". Further, even in the case that "prediction (i.e., intra prediction)" is expressed, it may be indicated that "intra prediction" is proposed as an example of "prediction".

Technical features that are individually described in one drawing in this document may be implemented individually or may be implemented at the same time.

Figure 2:
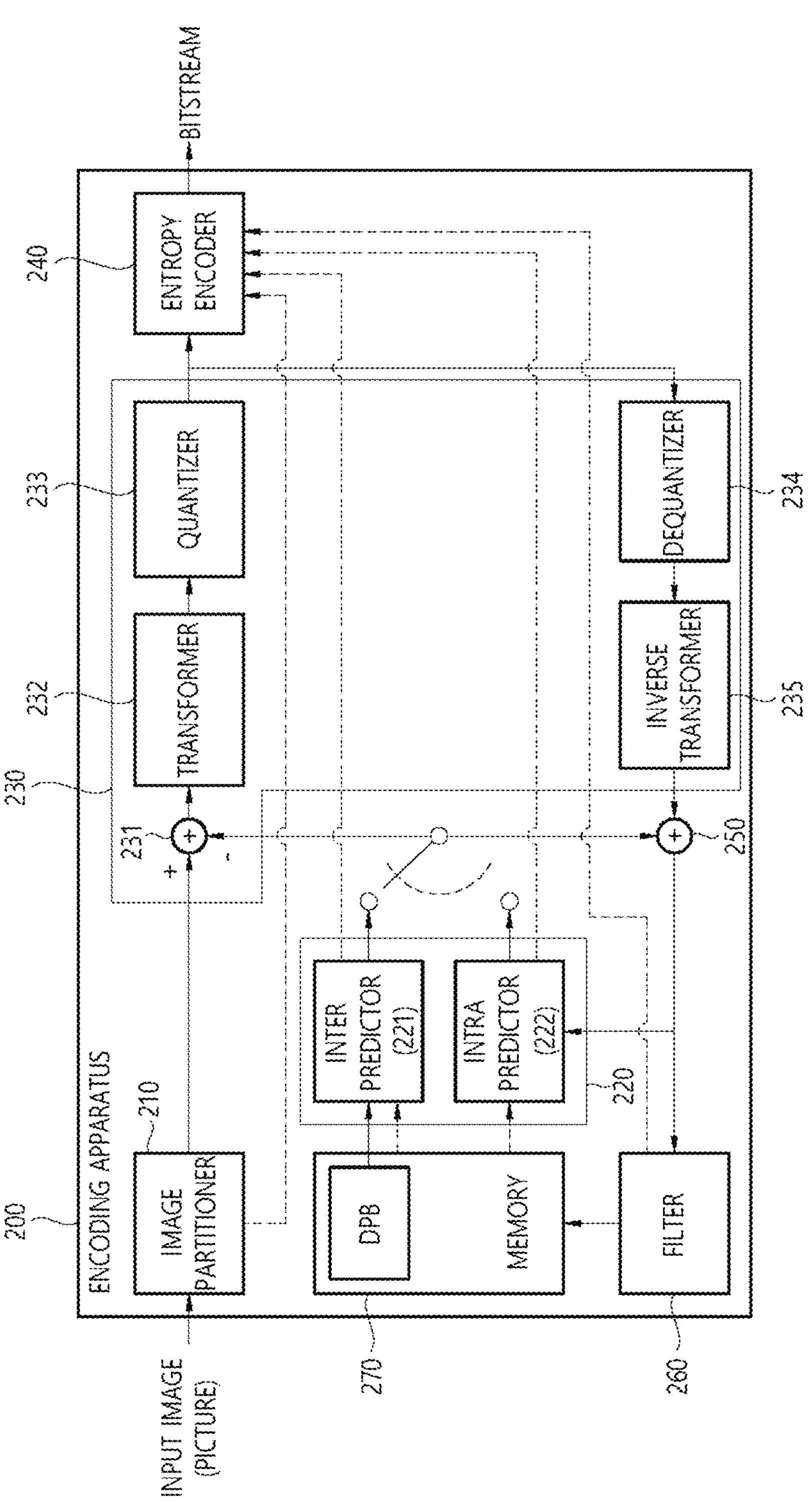
FIG. 2 is a diagram schematically illustrating a configuration of a video/image encoding apparatus to which embodiments of the present disclosure are applicable.

FIG. 2 is a schematic diagram illustrating a configuration of a video/image encoding apparatus to which the embodiment(s) of the present document may be applied. Hereinafter, the encoding apparatus may include an image encoding apparatus and/or a video encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a part for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
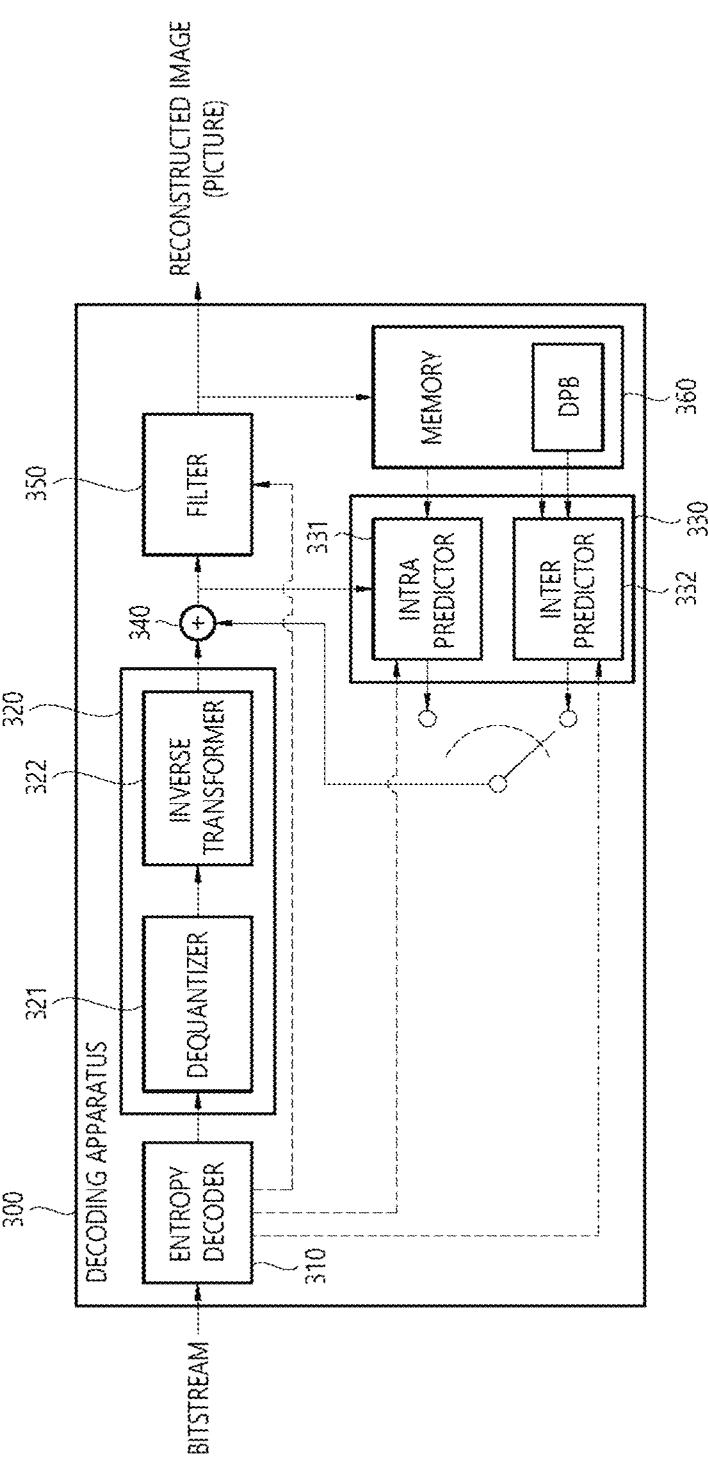
FIG. 3 is a diagram schematically illustrating a configuration of a video/image decoding apparatus to which embodiments of the present disclosure are applicable.

FIG. 3 is a schematic diagram illustrating a configuration of a video/image decoding apparatus to which the embodiment(s) of the present document may be applied. Hereinafter, the decoding apparatus may include an image decoding apparatus and/or a video decoding apparatus.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the inter predictor 332 and the intra predictor 331.

As described above, in performing video coding, a prediction is performed to enhance compression efficiency. A predicted block including prediction samples for a current block, that is, a target coding block, can be generated through the prediction. In this case, the predicted block includes the prediction samples in a spatial domain (or pixel domain). The predicted block is identically derived in the encoding apparatus and the decoding apparatus. The encoding apparatus can enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

Further, to improve subjective/objective image qualities, the encoding apparatus/the decoding apparatus may apply various filtering methods to the reconstructed picture to generate a modified reconstructed picture. The modified reconstructed picture may be stored in the memories, specifically, the DPB of the memories 270, 360 of the encoding apparatus/the decoding apparatus. Various filtering methods may include, for example, a deblocking filter, a sample adaptive offset, an adaptive loop filter, and a bilateral filter.

Meanwhile, in the image/video coding, the picture constituting the image/the video may be encoded/decoded in a series of decoding order. A picture order corresponding to an output order of the decoded picture may be set to be different from the decoding order, and based on the above, a backward prediction as well as a forward prediction may be performed upon inter prediction.

A picture decoding procedure may schematically include a picture reconstruction procedure and an in-loop filtering procedure for a reconstructed picture. A modified reconstructed picture may be generated through an in-loop filtering procedure, and the modified reconstructed picture may be output as a decoded picture, stored in the decoded picture buffer 360 or the memory of the decoding apparatus and used as a reference picture in an inter prediction procedure at the time of decoding a picture thereafter. The in-loop filtering procedure may include a deblocking filtering procedure, a sample adaptive offset (SAO) procedure, an adaptive loop filter (ALF) procedure, and/or a bi-lateral filter procedure, as described above. In this case, one or some of the deblocking filtering procedure, the sample adaptive offset (SAO) procedure, the adaptive loop filter (ALF) procedure, and the bi-lateral filter procedure may be sequentially applied, or all may be sequentially applied. For example, after the deblocking filtering procedure is applied to the reconstructed picture, the SAO procedure may be performed. Alternatively, for example, after the deblocking filtering procedure is applied to the reconstructed picture, the ALF procedure may be performed. This may also be performed in the encoding apparatus.

A picture encoding procedure may include not only a procedure of encoding information for picture reconstruction (e.g., partitioning information, prediction information, residual information, etc.) and outputting the information in the form of a bitstream but also a procedure of generating a reconstructed picture for the current picture and applying in-loop filtering thereto. In this case, a modified reconstructed picture may be generated through the in-loop filtering procedure, stored in the decoded picture buffer 270 or the memory and used as a reference picture in an inter prediction procedure at the time of encoding a picture thereafter as in the case of the decoding apparatus. When the in-loop filtering procedure is performed, (in-loop) filtering related information (parameters) may be encoded by the entropy encoder 240 and output in the form of a bitstream, and the decoding apparatus may perform the in-loop filtering procedure through the same method as that of the encoding apparatus based on the filtering related information.

Through this in-loop filtering procedure, noise generated during video/video coding, such as blocking artifacts and ringing artifacts, can be reduced and subjective/objective visual quality can be improved. In addition, by performing the in-loop filtering procedure in both the encoding apparatus and the decoding apparatus, the encoding apparatus and the decoding apparatus can derive the same prediction result, improve the reliability of picture coding, and reduce the amount of data that need to be transmitted for picture coding.

The filtering-related information may be signaled from the encoding apparatus to the decoding apparatus through, for example, high-level syntax (HLS). In the present disclosure, HLS may include at least one of APS syntax, PPS syntax, SPS syntax, VPS syntax, picture header syntax, and slice header syntax.

Figure 4:
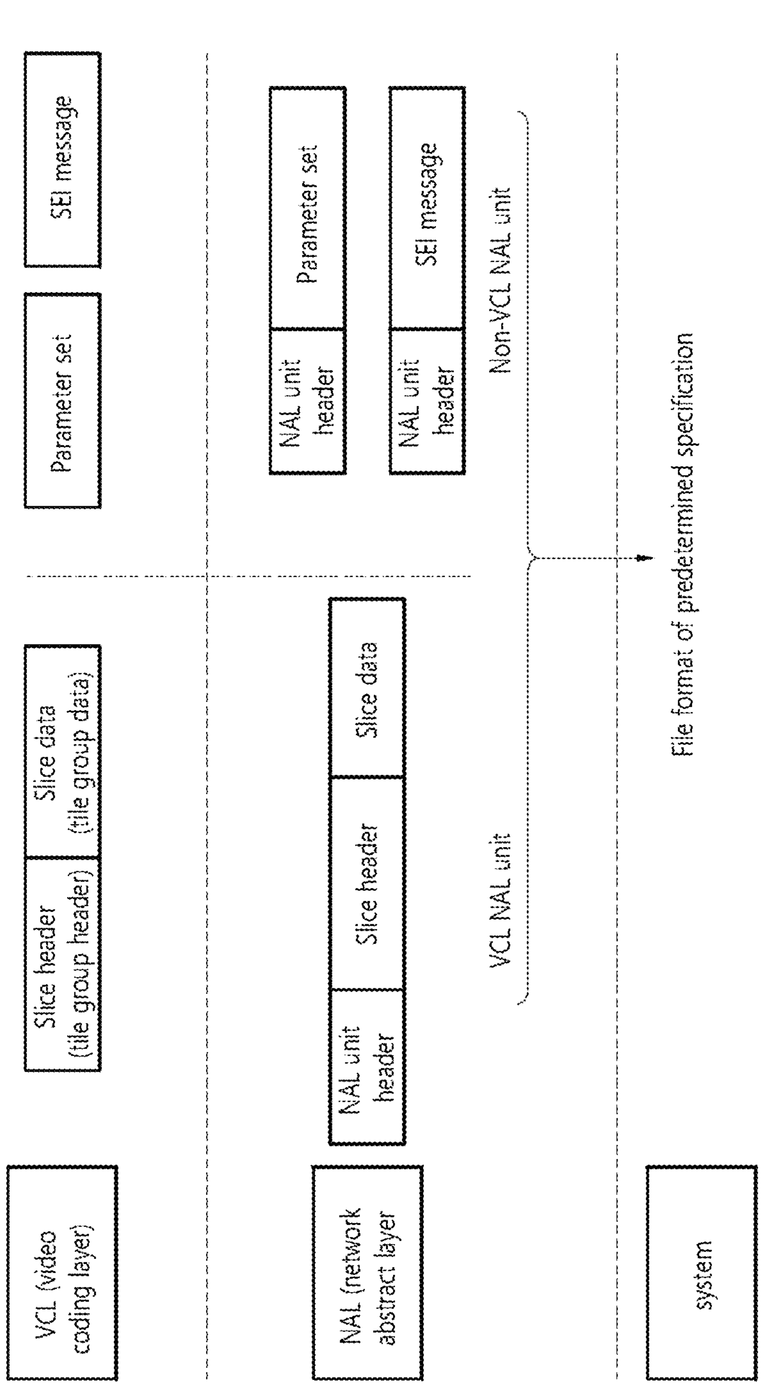
FIG. 4 illustrates a layered structure of a coded video/image.

FIG. 4 illustrates a layered structure of a coded video/image.

Referring to FIG. 4, a coded video/image is divided into a video coding layer (VCL) responsible for decoding of a video/image and dealing with the video/image data itself, a subsystem for transmitting and storing coded information, and a network abstraction layer (NAL) existing between the VCL and the subsystem and responsible for providing a network-adaptive functionality.

The VCL may generate VCL data including compressed image data (slice data) or may generate a parameter set including information on a picture parameter set (PPS), a sequence parameter set (SPS), and a video parameter set (VPS); or supplemental enhancement information (SEI) messages additionally needed for an image decoding process.

In the NAL, a NAL unit may be generated by adding header information (NAL unit header) to a Raw Byte Sequence Payload (RBSP) generated in the VCL. In this case, the RBSP is referred to as slice data, a parameter set, an SEI message, and the like, which are generated in the VCL. The NAL unit header may include NAL unit type information which is specified according to RBSP data included in the NAL unit.

As shown in FIG. 4, the NAL unit may be divided into a VCL NAL unit and a non-VCL NAL unit according to the RBSP generated in the VCL. The VCL NAL unit may refer to a NAL unit including information on the image (slice data), and the non-VCL NAL unit may refer to a NAL unit including information (the parameter set or the SEI message) needed for decoding an image.

The VCL NAL unit and the non-VCL NAL unit described above may be transmitted through a network by attaching header information according to the data specification of a lower system. For example, the NAL unit may be transformed into a data format of a predetermined specification such as H.266/VVC file format, RTP (Real-time Transport Protocol), TS (Transport Stream), and the like.

As described above, for the NAL unit, a NAL unit type may be specified according to an RBSP data structure included in the NAL unit, and the information for the NAL unit type may be stored in a NAL unit header and signaled.

For example, the NAL unit may be classified into a VCL NAL unit type and a non-VCL NAL unit type according to whether the NAL unit includes information (slice data) for an image. The VCL NAL unit type may be classified according to a property and type of a picture included in the VCL NAL unit, and the non-VCL NAL unit type may be classified according to a type of a parameter set.

The following shows one example of the NAL unit type specified according to the type of parameter set included in the non-VCL NAL unit type.

Adaptation Parameter Set (APS) NAL unit: type of NAL unit including an APS

Decoding Parameter Set (DPS) NAL unit: type of NAL unit including a DPS

Video Parameter Set (VPS) NAL unit: type of NAL unit including a VPS

Sequence Parameter Set (SPS) NAL unit: type of NAL unit including an SPS

Picture Parameter Set (PPS) NAL unit: type of NAL unit including a PPS

Picture Header (PH) NAL unit: type of NAL unit including a PH

The NAL unit types described above may have syntax information for the NAL unit type, and the syntax information may be stored in a NAL unit header and signaled. For example, the syntax information may be nal_unit_type, and the NAL unit types may be specified as a nal_unit_type value.

Meanwhile, as described above, one picture may include a plurality of slices, and one slice may include a slice header and slice data. In this case, one picture header may be further added to a plurality of slices (a slice header and a slice data set) within one picture. The picture header (picture header syntax) may include information/parameters commonly applicable to the picture. For example, a picture may consist of different types of slices, such as intra-coded slices (i.e., I-slice) and/or inter-coded slices (i.e., P-slice and B-slice). In this case, the picture header may include information/parameters applied to the intra-coded and inter-coded slices. Alternatively, one picture may consist of slices of one type.

The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to multiple layers. The DPS (DPS syntax) may include information/parameters commonly applicable to the entire video. The DPS may include information/parameters related to concatenating coded video sequences (CVS).

In the present disclosure, the video/image information encoded by the encoding apparatus and signaled to the decoding apparatus in the form of a bitstream may include not only the intra-picture partitioning-related information, intra/inter prediction information, residual information, and in-loop filtering information but also the information included in the slice header, the information included in the picture header, the information included in the APS, the information included in the PPS, the information included in the SPS, the information included in the VPS, and/or the information included in the DPS. Also, the video/image information may further include information on the NAL unit header.

Figure 5:
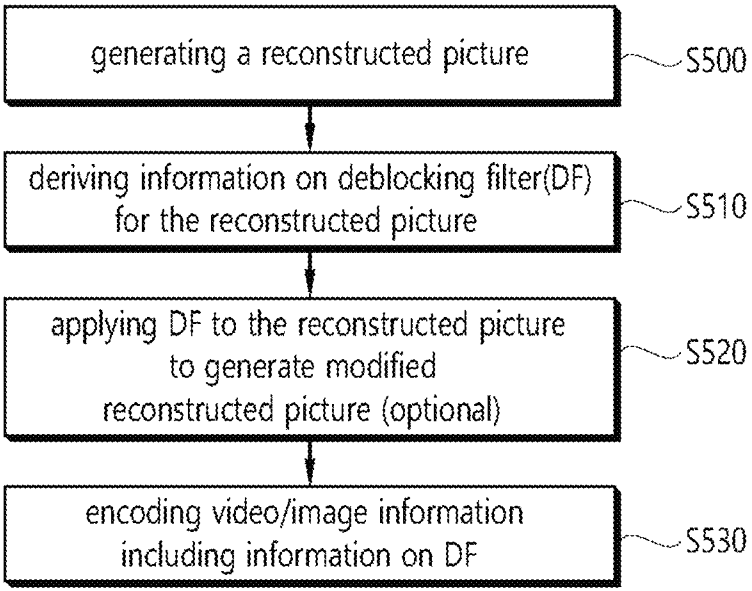
FIG. 5 illustrates a deblocking filtering-based video/image encoding method to which embodiments of the present disclosure may be applied.
Figure 6:
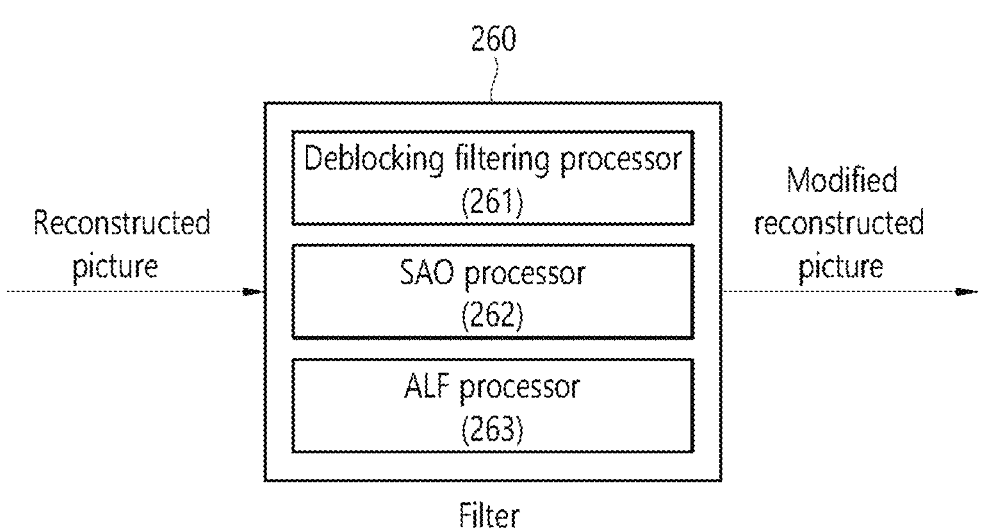
FIG. 6 illustrates a filter within an encoding apparatus.

FIG. 5 illustrates a deblocking filtering-based video/image encoding method to which embodiments of the present disclosure may be applied, and FIG. 6 illustrates a filter within an encoding apparatus. The deblocking filter within the encoding apparatus of FIG. 6 may be included in the filter 260 of the encoding apparatus 200 of FIG. 2.

Referring to FIG. 5 and FIG. 6, the encoding apparatus generates a reconstructed picture for the current picture (S500). As described above with reference to FIG. 2, the encoding apparatus may generate a reconstructed picture through procedures such as partitioning, intra/inter prediction, and residual processing performed on the input original picture. Specifically, the encoding apparatus may generate prediction samples for the current block through intra or inter prediction, generate residual samples based on the prediction samples, transforms/quantizes the residual samples, and then performs dequantization/inverse transformation processing thereon to derive (modified) residual samples. The reason for performing dequantization/inverse transformation again after transformation/quantization is to derive the same residual samples as the residual samples derived from the decoding apparatus as described above. This is because the quantization procedure is basically a lossy coding procedure and the transformation procedure is also lossy when reduced transform (RT) is applied. The encoding apparatus may generate a reconstructed block including reconstructed samples for the current block based on the prediction samples and the (modified) residual samples. The reconstructed picture may be generated based on the reconstructed block.

The encoding apparatus derives information on the deblocking filter for the reconstructed picture S510. The information on the deblocking filter may include information needed to perform a deblocking filtering procedure. For example, the information on the deblocking filter may include deblocking filter parameter information and information or flags indicating/specifying whether to signal the deblocking filter parameter information.

The encoding apparatus may perform deblocking filtering on the reconstructed picture S520. More specifically, the encoding apparatus may generate a modified reconstructed picture by performing deblocking filtering on the reconstructed picture. The modified reconstructed picture may be stored in the decoded picture buffer 270 or memory as a decoded picture and may then be used as a reference picture in an inter prediction procedure when encoding a picture. The filter 260 of the encoding apparatus may perform the deblocking filtering procedure. Specifically, the deblocking filtering procedure may be performed by the deblocking filtering processor 261 in the filter 260.

The encoding apparatus may encode image information including information for picture reconstruction and filtering-related information and output the encoded image information in the form of a bitstream S530. The output bitstream may be transmitted to the decoding apparatus through a storage medium or a network. The S530 step may be performed by the entropy encoder 240 of the encoding apparatus. The information for picture reconstruction may include the partitioning information described above/to be described below, prediction information, and residual information. The filtering-related information may include, for example, information on a deblocking filter. The filter 260 of the encoding apparatus may include an SAO processor 262 and an SAO processor 263 in addition to the deblocking filtering processor 261.

Figure 7:
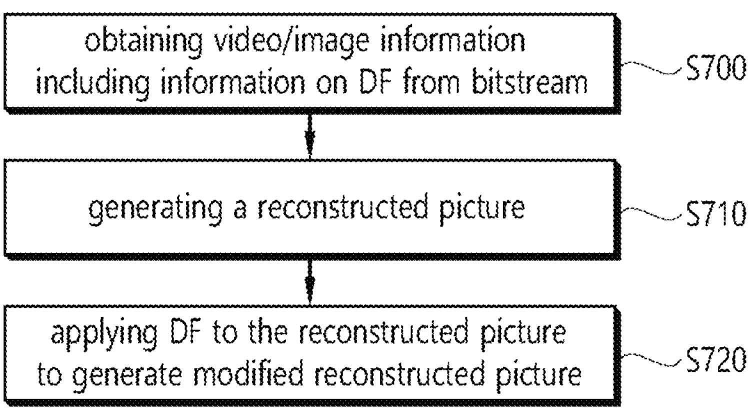
FIG. 7 illustrates a deblocking filtering-based video/image decoding method to which embodiments of the present disclosure may be applied.
Figure 8:
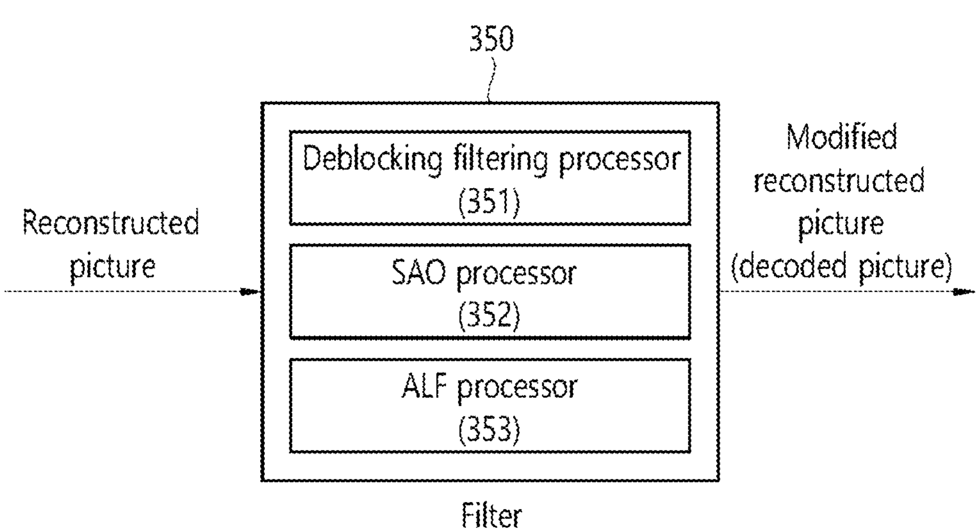
FIG. 8 illustrates a filter within a decoding apparatus.

FIG. 7 illustrates a deblocking filtering-based video/image decoding method to which embodiments of the present disclosure may be applied, and FIG. 8 illustrates a filter within a decoding apparatus. The deblocking filtering processor within the decoding apparatus of FIG. 8 may be included in the filter 350 of the decoding apparatus 300 of FIG. 3. Also, the decoding apparatus may perform the operation corresponding to the operation performed in the encoding apparatus.

Referring to FIGS. 7 and 8, the decoding apparatus may obtain image information including information for picture reconstruction and the information on a deblocking filter from a received bitstream S700. The S700 step may be performed by the entropy decoder 310 of the decoding apparatus. The information for picture reconstruction may include the partitioning information described above/to be described below, prediction information, and residual information. The information on the deblocking filter may include information needed to perform a blocking filtering procedure. For example, the information on the deblocking filter may include deblocking filter parameter information and flags indicating/specifying whether to signal the deblocking filter parameter information.

The decoding apparatus generates a reconstructed picture for the current picture based on the information for picture reconstruction (S710). As described above with reference to FIG. 3, the decoding apparatus may generate a reconstructed picture through procedures such as intra/inter prediction and residual processing for the current picture. Specifically, the decoding apparatus generates prediction samples for the current block through intra or inter prediction based on prediction information included in the information for picture reconstruction and derives residual samples for the current block based on residual information included in the information for picture reconstruction (based on dequantization/inverse transformation). The decoding apparatus may generate a reconstructed block including reconstructed samples for the current block based on the prediction samples and the residual samples. A reconstructed picture may be generated based on the reconstructed block.

The decoding apparatus performs deblocking filtering on the reconstructed picture S720. More specifically, the decoding apparatus may generate a modified reconstructed picture by performing deblocking filtering on the reconstructed picture. The modified reconstructed picture may be output and/or stored in the decoded picture buffer 360 or memory as a decoded picture and may then be used as a reference picture in an inter prediction procedure when decoding a picture. The S720 step may be performed by the filter 350 of the decoding apparatus. Specifically, the deblocking filtering procedure may be performed by the deblocking filtering processor 351. The filter 350 of the decoding apparatus may include an SAO processor 352 and an SAO processor 353 in addition to the deblocking filtering processor 351.

Meanwhile, as described above, the encoding apparatus/the decoding apparatus may reconstruct the picture in units of block. If the image is reconstructed in units of block, a block distortion may occur in a boundary between the blocks in the reconstructed picture. Therefore, the encoding apparatus and the decoding apparatus may use the deblocking filter to remove the block distortion occurring in the boundary between the blocks in the reconstructed picture. The deblocking filter procedure may, for example, derive a target boundary in the reconstructed picture, determine a boundary strength (bs) for the target boundary, derive deblocking parameters, and perform the deblocking filtering for the target boundary based on the bs and the deblocking parameters. The bs may be determined based on prediction modes of two blocks adjacent to the target boundary, a difference between the motion vectors thereof, whether the reference pictures thereof are the same, and whether a non-zero significant coefficient exists therein.

Figure 9:
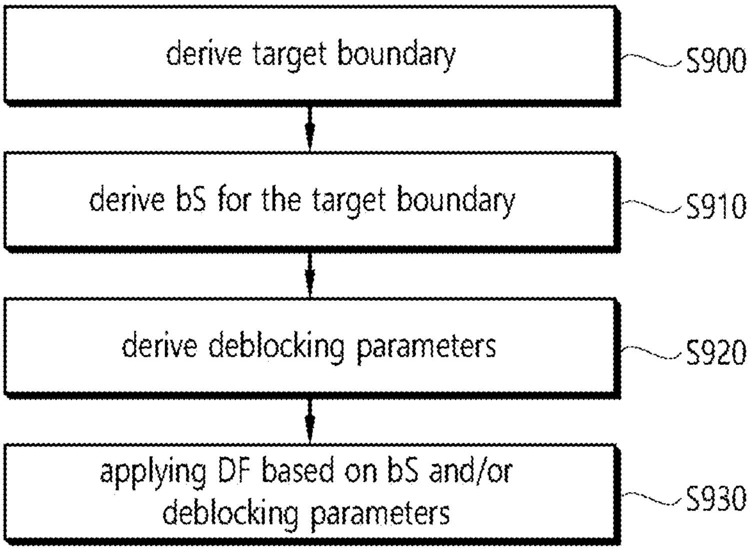
FIG. 9 illustrates one embodiment of a method for performing deblocking filtering.

FIG. 9 exemplarily illustrates an exemplary embodiment of a method for performing the deblocking filter process. The method illustrated in FIG. 9 may be performed by the aforementioned filter 260 in the encoding apparatus illustrated in FIG. 2 and the aforementioned filter 350 in the decoding apparatus illustrated in FIG. 3.

Referring to FIG. 9, the encoding apparatus/the decoding apparatus may derive the boundary between the blocks on which the deblocking filtering is performed in the reconstructed picture (S900). Meanwhile, the boundary on which the deblocking filtering is performed may be referred to as an edge. Further, the boundary on which the deblocking filtering is performed may include two types, and the two types may be a vertical boundary and a horizontal boundary. The vertical boundary may be referred to as a vertical edge, and the horizontal boundary may be referred to as a horizontal edge. The encoding apparatus/the decoding apparatus may perform the deblocking filtering for the vertical edge, and perform the deblocking filtering for the horizontal edge.

When performing the deblocking filtering for one direction (i.e., the deblocking filtering for the vertical boundary or the deblocking filtering for the horizontal boundary), the encoding apparatus/the decoding apparatus may derive a transform block boundary. The encoding apparatus/the decoding apparatus may derive a coding subblock boundary.

The encoding apparatus/the decoding apparatus may derive the block boundary on which the deblocking filtering is performed based on a grid of an N×N size. For example, the encoding apparatus/the decoding apparatus may derive the block boundary on which the deblocking filtering is performed based on whether the boundary of the block (the transform block or the coding subblock) corresponds to the grid of the N×N size. In other words, for example, the encoding apparatus/the decoding apparatus may derive the block boundary on which the deblocking filtering is performed based on whether the boundary of the block (the transform block or the coding subblock) is the block boundary positioned on the grid of the N×N size. The encoding apparatus/the decoding apparatus may derive the boundary of the block corresponding to the grid of the N×N size as the block boundary on which the deblocking filtering is performed. Here, the grid of the N×N size may mean a boundary derived by splitting the reconstructed picture into a square of the N×N size. The grid of the N×N size may be, for example, a grid of a 4×4 or 8×8 size.

The encoding apparatus/the decoding apparatus may determine the boundary strength (bs) of the boundary on which the deblocking filtering is performed (S910). The bs may also be referred to as a boundary filtering strength.

The encoding apparatus/the decoding apparatus may determine the bs based on the blocks adjacent to the boundary on which the deblocking filtering is performed. For example, a case of obtaining the bs value of the boundary (block edge) between a block P and a block Q may be assumed. In this case, the encoding apparatus/the decoding apparatus may determine the bs value of the boundary based on information about positions of the block P and the block Q and/or whether the block P and the block Q are coded in the intra mode.

Here, the block P may represent a block including a p0 sample adjacent to the boundary on which the deblocking filtering is performed, and the block Q may represent a block including a q0 sample adjacent to the boundary on which the deblocking filtering is performed.

For example, the p0 may represent a sample of a block adjacent to a left or a top of the boundary on which the deblocking filtering is performed, and the q0 may represent a sample of a block adjacent to a right or a bottom of the boundary on which the deblocking filtering is performed. As an example, if a direction of the filtering boundary is a vertical direction (i.e., if the filtering boundary is the vertical boundary), the p0 may represent the sample of the block adjacent to the left of the boundary on which the deblocking filtering is performed, and the q0 may represent the sample of the block adjacent to the right of the boundary on which the deblocking filtering is performed. Alternatively, as another example, if the direction of the filtering boundary is a horizontal direction (i.e., if the filtering boundary is the horizontal boundary), the p0 may represent the sample of the block adjacent to the top of the boundary on which the deblocking filtering is performed, and the q0 may represent the sample of the block adjacent to the bottom of the boundary on which the deblocking filtering is performed.

The encoding apparatus/decoding apparatus may derive deblocking parameters S920. The deblocking parameters may include parameters related to beta and tc. The beta and tc values may be derived based on the deblocking filter parameter information according to the present disclosure.

The encoding apparatus/the decoding apparatus may perform the deblocking filtering based on the bs and the deblocking parameters (S930).

For example, the encoding apparatus/the decoding apparatus may determine whether the filtering process for all block boundaries in the reconstructed picture is performed, and if the filtering process for all block boundaries is not performed, the encoding apparatus/the decoding apparatus may determine whether the position of the boundary of the subblock corresponds to the grid of the N×N size (e.g., 8×8 grid). For example, it may be determined whether a remainder derived by dividing the x component and the y component of the boundary position of the subblock by an N is 0. If the remainder derived by dividing the x component and the y component of the position of the boundary of the subblock by the N is 0, the position of the boundary of the subblock may correspond to the grid of the N×N size. If the position of the boundary of the subblock corresponds to the grid of the N×N size, the encoding apparatus/the decoding apparatus may perform the deblocking filtering on the boundary based on the bs of the boundary and the deblocking parameters.

Meanwhile, based on the determined bs value and values of the deblocking parameters, the encoding apparatus/the decoding apparatus may determine a filter applied to the boundary between the blocks. The filter may be divided into a strong filter and a weak filter. The encoding apparatus/the decoding apparatus may perform the filtering for a boundary at a position at which the block distortion is highly likely to occur in the reconstructed picture and a boundary at a position at which the block distortion is less likely to occur therein with different filters, thereby enhancing coding efficiency.

The encoding apparatus/the decoding apparatus may perform the deblocking filtering on the boundary between the blocks using the determined filter (e.g., the strong filter or the weak filter). If the deblocking filtering processes for all of the boundaries between the blocks in the reconstructed picture are performed, the deblocking filtering process may be terminated.

FIG. 10 illustrates a conventional deblocking filtering process.

Referring to FIG. 10, deblocking filter control present flag information (deblocking_filter_control_present_flag) for determining whether a picture or an intra-picture slice referring to a PPS performs deblocking filter control may be signaled through the PPS.

If the value of the deblocking filter control present flag information (deblocking_filter_control_present_flag) is 0, a default value of 0 may be applied for deblocking filtering. If the value of the deblocking filter control present flag information (deblocking_filter_control_present_flag) is 1, deblocking filter override enabled flag information (deblocking_filter_override_enabled_flag) and PPS deblocking filter disabled flag (pps_deblocking_filter_disabled_flag) may be signaled through the PPS.

Based on the case in which the value of the PPS deblocking filter disabled flag (pps_deblocking_filter_disabled_flag) is 0, deblocking filtering at the PPS level may be performed on slices referring to the PPS. In this case, the PPS deblocking filter parameter may be signaled through the PPS. The PPS deblocking filter parameters may include parameter information related to the luma component and parameter information related to the chroma component. The parameter information related to the luma component may include parameter information related to the beta offset of the luma component and parameter information related to the tc offset of the luma component. The parameter information related to the chroma component may include parameter information related to the beta offset (cb beta offset and cr beta offset) of the chroma component and parameter information related to the tc offset (cb tc offset and cr tc offset) of the chroma component.

Also, deblocking filtering at the picture header (in what follows, it is referred to as 'PH') or slice header (in what follows, it is referred to as 'SH') level may be performed according to the value of the deblocking filter override enabled flag (deblocking_filter_override_enabled_flag).

More specifically, if the value of the deblocking filter override enabled flag (deblocking_filter_override_enabled_flag) is 0, deblocking filtering may be performed at the PPS level. In this case, only the deblocking filter parameters signaled at the PPS may be used to perform the deblocking filtering.

Based on the case in which the value of the deblocking filter override enabled flag (deblocking_filter_override_enabled_flag) is 1, the PH deblocking filter information flag (dbf_info_in_ph_flag) may be signaled. The PH deblocking filter information flag (dbf_info_in_ph_flag) is a flag related to whether deblocking filter parameters are signaled at the PH level.

The PH may receive the signaling of the PH deblocking filter override flag (ph_deblocking_filter_override_flag) based on the case in which the value of the deblocking filter override enabled flag (deblocking_filter_override_enabled_flag) is 1, and the value of the PH deblocking filter information flag (dbf_info_in_ph_flag) is 1; based on the case in which the value of the PH deblocking filter override flag (ph_deblocking_filter_override_flag) is 1, the PH may receive the signaling of the PH deblocking filter disabled flag (ph_deblocking_filter_disabled_flag). The PH may receive the signaling of PH deblocking parameters based on the case in which the value of the PH deblocking filter disabled flag (ph_deblocking_filter_disabled_flag) is 0. As for the PH deblocking parameters, parameter information related to the luma component may include parameter information related to the beta offset of the luma component and parameter information related to the tc offset of the luma component. The parameter information related to the chroma component may include parameter information related to the beta offset (cb beta offset and cr beta offset) of the chroma component and parameter information related to the tc offset (cb tc offset and cr tc offset) of the chroma component.

The SH may receive the signaling of the slice deblocking filter override flag (slice_deblocking_filter_override_flag) based on the case in which the value of the deblocking filter override enabled flag (deblocking_filter_override_enabled_flag) is 1, and the value of the PH deblocking filter information flag (dbf_info_in_ph_flag) is 1. Based on the case in which the value of the slice deblocking filter override flag (slice_deblocking_filter_override_flag) is 1, the SH may receive the signaling of the slice deblocking filter disabled flag (slice_deblocking_filter_disabled_flag), and based on the case in which the value of the slice deblocking filter disabled flag (slice_deblocking_filter_disabled_flag) is 0, the SH may receive the signaling of SH deblocking parameter. As for the SH deblocking parameters, parameter information related to the luma component may include parameter information related to the beta offset of the luma component and parameter information related to the tc offset of the luma component. The parameter information related to the chroma component may include parameter information related to the beta offset (cb beta offset and cr beta offset) of the chroma component and parameter information related to the tc offset (cb tc offset and cr tc offset) of the chroma component.

To summarize, deblocking filter parameters may be signaled at the PPS level based on the case in which the value of the PPS deblocking filter disabled flag (pps_deblocking_filter_disabled_flag) is 0, and the value of the deblocking filter override enabled flag (deblocking_filter_override_enabled_flag) is 0. Based on the case in which the value of the PPS deblocking filter disabled flag (pps_deblocking_filter_disabled_flag) is 0, and the value of the deblocking filter override enabled flag (deblocking_filter_override_enabled_flag) is 1, the deblocking filter parameters may be signaled at the PPS level, PH level, and SH level according to the value of the PH deblocking filter information flag (dbf_info_in_ph_flag).

Unlike the case above, based on the case in which the value of the PPS deblocking filter disabled flag (pps_deblocking_filter_disabled_flag) is 1, deblocking filtering at the PPS level is not performed for slices referring to the PPS. In other words, the PPS deblocking parameter is not signaled. However, according to the value of the deblocking filter override enabled flag (deblocking_filter_override_enabled_flag), deblocking filtering may be performed at a lower level, for example, PH or SH level.

More specifically, based on the case in which the value of the deblocking filter override enabled flag (deblocking_filter_override_enabled_flag) is 0, deblocking filtering is not performed even at the PH or SH level.

The PH deblocking filter information flag (dbf_info_in_ph_flag) may be signaled based on the case in which the value of the deblocking filter override enabled flag (deblocking_filter_override_enabled_flag) is 1.

The PH may receive the signaling of the PH deblocking filter override flag (ph_deblocking_filter_override_flag) based on the case in which the value of the deblocking filter override enabled flag (deblocking_filter_override_enabled_flag) is 1, and the value of the PH deblocking filter information flag (dbf_info_in_ph_flag) is 1; based on the case in which the value of the PH deblocking filter override flag (ph_deblocking_filter_override_flag) is 1, the PH may receive the signaling of the PH deblocking filter disabled flag (ph_deblocking_filter_disabled_flag). The PH may receive the signaling of PH deblocking parameters if the value of the PH deblocking filter disabled flag (ph_deblocking_filter_disabled_flag) is 0. As for the PH deblocking parameters, parameter information related to the luma component may include parameter information related to the beta offset of the luma component and parameter information related to the tc offset of the luma component. The parameter information related to the chroma component may include parameter information related to the beta offset (cb beta offset and cr beta offset) of the chroma component and parameter information related to the tc offset (cb tc offset and cr tc offset) of the chroma component.

The SH may receive the signaling of the slice deblocking filter override flag (slice_deblocking_filter_override_flag) based on the case in which the value of the deblocking filter override enabled flag (deblocking_filter_override_enabled_flag) is 1, and the value of the PH deblocking filter information flag (dbf_info_in_ph_flag) is 1. Based on the case in which the value of the slice deblocking filter override flag (slice_deblocking_filter_override_flag) is 1, the SH may receive the signaling of the slice deblocking filter disabled flag (slice_deblocking_filter_disabled_flag), and based on the case in which the value of the slice deblocking filter disabled flag (slice_deblocking_filter_disabled_flag) is 0, the SH may receive the signaling of SH deblocking parameter. As for the SH deblocking filter parameters, parameter information related to the luma component may include parameter information related to the beta offset of the luma component and parameter information related to the tc offset of the luma component. The parameter information related to the chroma component may include parameter information related to the beta offset (cb beta offset and cr beta offset) of the chroma component and parameter information related to the tc offset (cb tc offset and cr tc offset) of the chroma component.

To summarize, deblocking filter parameters are not signaled based on the case in which the value of the PPS deblocking filter disabled flag (pps_deblocking_filter_disabled_flag) is 1, and the value of filter override enabled the deblocking flag (deblocking_filter_override_enabled_flag) is 0. Therefore, deblocking filtering is not performed. Based on the case in which the value of the PPS deblocking filter disabled flag (pps_deblocking_filter_disabled_flag) is 1, and the value of the deblocking filter override enabled flag (deblocking_filter_override_enabled_flag) is 1, the deblocking filter parameters may be signaled at the PH level and SH level according to the value of the PH deblocking filter information flag (dbf_info_in_ph_flag).

For example, the picture parameter set (PPS) for performing the conventional deblocking filtering may include the syntax of Table 1 below.

TABLE 1

| | Descriptor |
|---|---|
| pic_parameter_set_rbsp( ) { | |
| pps_pic_parameter_set_id | ue(v) |
| deblocking_filter_control_present_flag | u(1) |
| if( deblocking_filter_control_present_flag ) { | |
| deblocking_filter_override_enabled_flag | u(1) |
| pps_deblocking_filter_disabled_flag | u(1) |
| if( !pps_deblocking_filter_disabled_flag ) { | |
| pps_beta_offset_div2 | se(v) |
| pps_tc_offset_div2 | se(v) |
| pps_cb_beta_offset_div2 | se(v) |
| pps_cb_tc_offset_div2 | se(v) |
| pps_cr_beta_offset_div2 | se(v) |
| pps_cr_tc_offset_div2 | se(v) |
| } | |
| } | |
| if( deblocking_filter_override_enabled_flag ) | |
| dbf_info_in_ph_flag | u(1) |
| ... | |
| } | |

The semantics of the syntax elements included in the syntax of Table 1 may be expressed, for example, as shown in Table 2 below.

TABLE 2 deblocking_filter_control_present_flag equal to 1 specifies the presence of deblocking filter control syntax elements in the PPS. deblocking filter control present flag equal to 0 specifies the absence of deblocking filter control syntax elements in the PPS.

deblocking_filter_override_enabled_flag equal to 1 specifies the presence of ph_deblocking_filter_override_flag in the PHs referring to the PPS or slice deblocking filter override flag in the slice headers referring to the PPS. deblocking_filter_override_enabled_flag equal to 0 specifies the absence of ph_deblocking_filter_override_flag in PHs referring to the PPS or slice_deblocking_filter_override_flag in slice headers referring to the PPS. When not present, the value of deblocking_filter_override_enabled_flag is inferred to be equal to 0.

pps_deblocking_filter_disabled_flag equal to 1 specifies that the operation of deblocking filter is not applied for slices referring to the PPS in which slice deblocking filter disabled flag is not present.

pps_deblocking_filter_disabled_flag equal to 0 specifies that the operation of the deblocking filter is applied for slices referring to the PPS in which slice_deblocking_filter_disabled_flag is not present. When not present, the value of pps_deblocking_filter_disabled_flag is inferred to be equal to 0.

pps_beta_offset_div2 and pps_tc_offset_div2 specify the default deblocking parameter offsets for β and tC (divided by 2) that are applied to the luma component for slices referring to the PPS, unless the default deblocking TABLE 2-continued

| |
|---|
| parameter offsets are overridden by the deblocking parameter offsets present in the picture headers or the slice headers of the slices referring to the PPS. The values of pps_beta_offset_div2 and pps_tc_offset_div2 shall both be in the range of −12 to 12, inclusive. When not present, the values of pps_beta_offset_div2 and pps_tc_offset_div2 are both inferred to be equal to 0. |
| pps_cb_beta_offset_div2 and pps_cb_tc_offset_div2 specify the default deblocking parameter offsets for β and tC (divided by 2) that are applied to the Cb component for slices referring to the PPS, unless the default deblocking parameter offsets are overridden by the deblocking parameter offsets present in the picture headers or the slice headers of the slices referring to the PPS. The values of pps_cb_beta_offset_div2 and pps_cb_tc_offset_div2 shall both be in the range of −12 to 12, inclusive. When not present, the values of pps_cb_beta_offset_div2 and pps cb tc offset div2 are both inferred to be equal to 0. |
| pps_cr_beta_offset_div2 and pps_cr_tc_offset_div2 specify the default deblocking parameter offsets for β and tC (divided by 2) that are applied to the Cr component for slices referring to the PPS, unless the default deblocking parameter offsets are overridden by the deblocking parameter offsets present in the picture headers or the slice headers of the slices referring to the PPS. The values of pps_cr_beta_offset_div2 and pps_cr_tc_offset_div2 shall both be in the range of −12 to 12, inclusive. When not present, the values of pps_cr_beta_offset_div2 and pps_cr_tc_offset_div2 are both inferred to be equal to 0. |
| rpl_info_in_ph_flag equal to 1 specifies that reference picture list information is present in the PH syntax structure and not present in slice headers referring to the PPS that do not contain a PH syntax structure. rpl info in ph flag equal to 0 specifies that reference picture list information is not present in the PH syntax structure and may be present in the slice headers referring to the PPS that do not contain a PH syntax structure. |
| dbf_info_in_ph_flag equal to 1 specifies that reference picture list information is present in the PH syntax structure and not present in slice headers referring to the PPS that do not contain a PH syntax structure. dbf info in ph flag equal to 0 specifies that deblocking filter information is not present in the PH syntax structure and may be present in slice headers referring to the PPS that do not contain a PH syntax structure. When not present, the value of dbf info in ph flag is inferred to be equal to 0. |

For example, the picture header (PH) for performing the conventional deblocking filtering may include the syntax of Table 3 below.

TABLE 3

| | Descriptor |
|---|---|
| slice_header( ) { | |
| ... | u(1) |
| if( deblocking_filter_override_enabled_flag && !dbf_info_in_ph_flag ) | |
| slice_deblocking_filter_override_flag | u(1) |
| if( slice_deblocking_filter_override_flag ) { | |
| slice_deblocking_filter_disabled_flag | u(1) |
| if( !slice_deblocking_filter_disabled_flag ) { | |
| slice_beta_offset_div2 | se(v) |

TABLE 3-continued

| | Descriptor |
|---|---|
| slice_tc_offset_div2 | se(v) |
| slice_cb_beta_offset_div2 | se(v) |
| slice_cb_tc_offset_div2 | se(v) |
| slice_cr_beta_offset_div2 | se(v) |
| slice_cr_tc_offset_div2 | se(v) |
| } | |
| } | |
| ... | |
| } | |

The semantics of the syntax elements included in the syntax of Table 3 may be expressed, for example, as shown in Table 4 below.

TABLE 4

| |
|---|
| ph_deblocking_filter_override_flag equal to 1 specifies that deblocking parameters are present in the PH. ph deblocking filter override flag equal to 0 specifies that deblocking parameters are not present in the PH. When not present, the value of ph_deblocking_filter_override_flag is inferred to be equal to 0. |
| ph_deblocking_filter_disabled_flag equal to 1 specifies that the operation of the deblocking filter is not applied for the slices associated with the PH. ph deblocking filter disabled flag equal to 0 specifies that the operation of the deblocking filter is applied for the slices associated with the PH. When ph_deblocking_filter_disabled_flag is not present, it is inferred to be equal to pps_deblocking_filter_disabled_flag. |
| ph_beta_offset_div2 and ph_tc_offset_div2 specify the deblocking parameter offsets for β and tC (divided by 2) that are applied to the luma component for the slices associated with the PH. The values of ph beta offset div2 and ph_tc_offset_div2 shall both be in the range of −12 to 12, inclusive. When not present, the values of ph_beta_offset_div2 and ph_tc_offset_div2 are inferred to be equal to pps_beta_offset_div2 and pps_tc_offset_div2, respectively. |
| ph_cb_beta_offset_div2 and ph_cb_tc_offset_div2 specify the deblocking parameter offsets for β and tC (divided by 2) that are applied to the Cb component for the slices associated with the PH. The values of ph_cb_beta_offset_div2 and ph_cb_tc_offset_div2 shall both be in the range of −12 to 12, inclusive. When not present, the values of ph_cb_beta_offset_div2 and ph_cb_tc_offset_div2 are inferred to be equal to pps cb beta offset div2 and pps cb tc offset div2, respectively. |
| ph_cr_beta_offset_div2 and ph_cr_tc_offset_div2 specify the deblocking parameter offsets for β and tC (divided by 2) that are applied to the Cr component for the slices associated with the PH. The values of ph_cr_beta_offset_div2 and ph_cr_tc_offset_div2 shall both be in the range of −12 to 12, inclusive. When not present, the values of ph_cr_beta_offset_div2 and ph_cr_tc_offset_div2 are inferred to be equal to pps cr beta offset div2 and pps cr tc offset div2, respectively. |

For example, the slice header (SH) for performing the conventional deblocking filtering may include the syntax of Table 5 below.

TABLE 5

| | Descriptor |
|---|---|
| slice_header( ) { | |
| ... | u(1) |
| if( deblocking_filter_override_enabled_flag && !dbf_info_in_ph_flag ) | |
| slice_deblocking_filter_override_flag | u(1) |
| if( slice_deblocking_filter_override_flag ) { | |
| slice_deblocking_filter_disabled_flag | u(1) |
| if( !slice_deblocking_filter_disabled_flag ) { | |
| slice_beta_offset_div2 | se(v) |
| slice_tc_offset_div2 | se(v) |
| slice_cb_beta_offset_div2 | se(v) |
| slice_cb_tc_offset_div2 | se(v) |
| slice_cr_beta_offset_div2 | se(v) |
| slice_cr_tc_offset_div2 | se(v) |
| } | |
| } | |
| ... | |
| } | |

The semantics of the syntax elements included in the syntax of Table 5 may be expressed, for example, as shown in Table 6 below.

TABLE 6

| |
|---|
| slice_deblocking_filter_override_flag equal to 1 specifies that deblocking parameters are present in the slice header. slice deblocking filter override flag equal to 0 specifies that deblocking parameters are not present in the slice header. When not present, the value of slice_deblocking_filter_override_flag is inferred to be equal to ph_deblocking_filter_override_flag. |
| slice_deblocking_filter_disabled_flag equal to 1 specifies that the operation of deblocking filter is not applied for the current slice. slice deblocking filter disabled flag equal to 0 specifies that the operation of the deblocking filter is applied for the current slice. When slice_deblocking_filter_disabled_flag is not present, it is inferred to be equal to ph_deblocking_filter_disabled_flag. |
| slice_beta_offset_div2 and slice_tc_offset_div2 specify the deblocking parameter offsets for β and tC (divided by 2) that are applied to the luma component for the current slice. The values of slice beta offset div2 and slice_tc_offset_div2 shall both be in the range of −12 to 12, inclusive. When not present, the values of slice_beta_offset_div2 and slice_tc_offset_div2 are inferred to be equal to ph_beta_offset_div2 and ph_tc_offset_div2, respectively. |
| slice_cb_beta_offset_div2 and slice_cb_tc_offset_div2 specify the deblocking parameter offsets for β and tC (divided by 2) that are applied to the Cb component for the current slice. The values of slice cb beta offset div2 and slice_cb_tc_offset_div2 shall both be in the range of −12 to 12, inclusive. When not present, the values of slice_cb_beta_offset_div2 and slice_cb_tc_offset_div2 are inferred to be equal to ph_cb_beta_offset_div2 and ph cb tc offset div2, respectively. |
| slice_cb_beta_offset_div2 and slice_cb_tc_offset_div2 specify the deblocking parameter offsets for β and tC (divided by 2) that are applied to the Cr component for the current slice. The values of slice cr beta offset div2 and slice_cr_tc_offset_div2 shall both be in the range of −12 to 12, inclusive. When not present, the values of slice_cr_beta_offset_div2 and slice_cr_tc_offset_div2 are inferred to be equal to ph_cr_beta_offset_div2 and ph cr tc offset div2, respectively. |

The deblocking filtering procedure based on the VVC standard is controlled using a multi-layered signaling approach. According to the conventional deblocking filtering, deblocking offsets may be overridden in the picture header (PH) or slice header (SH) after being signaled to the PPS. In addition, deblocking has always been an essential tool enabled by default.

The conventional deblocking filtering procedure is highly complicated and difficult to understand since the procedure allows deblocking filtering to be switched on at the PH level (or SH level), which is a lower level, even when the deblocking filtering is turned off at the PPS level, which is an upper level. Also, the conventional deblocking filtering procedure has a problem that the procedure is highly complicated because too many layers may be involved to signal the deblocking offsets.

On the other hand, the present disclosure proposes a method for performing deblocking filtering in a way easier to understand and more clearly. More specifically, while the conventional deblocking filtering process was complicated and inefficient because a plurality of layers is involved in signaling information on the deblocking filter, the present disclosure proposes a method for redesigning and simplifying the syntax structure for signaling the information on the deblocking filter. In other words, the present disclosure proposes a method for efficiently signaling deblocking filter parameter information.

The embodiments of the present disclosure may include one or more of the following features.

Feature 1) A flag indicating whether deblocking is enabled/applied to a picture referring to the parameter set may be signaled through a parameter set. This flag may be signaled through the picture parameter set (PPS) and may be expressed in the form of pps_deblocking_enabled_flag syntax element. Alternatively, this flag may be signaled through the sequence parameter set (SPS) and may be expressed in the form of sps_deblocking_enabled_flag syntax element. The pps_ deblocking_enabled_flag syntax element may be used interchangeably with the deblocking_filter_enabeld_flag syntax element.

Feature 2) When deblocking is enabled (e.g., if the value of the pps_deblocking_enabled_flag syntax element is 1), the following additional flags may be signaled.

a) A flag may be signaled, which indicates whether deblocking control is present at a lower level (e.g., picture header (PH) or slice header (SH)) than the parameter set itself. The flag may be expressed in the form of pps_deblocking_filter_override_enabled_flag syntax element. The pps_deblocking_filter_override_enabled_flag syntax element may be used interchangeably with the deblocking_filter_override_enabled_flag syntax element. In other words, for example, when deblocking is enabled at the PPS, which is an upper level, a flag indicating whether deblocking control is performed at the PH or SH, which is a lower level, may be additionally signaled.

b) A flag indicating the existence of parameter information applicable to all pictures referring to the parameter set may be signaled. The flag may be expressed in the form of a pps_deblocking_parameters_present_flag syntax element. The pps_deblocking parameters_present_flag syntax element may be used interchangeably with the pps_deblocking_filter_params_present_flag syntax element or the pps_deblocking_params_present_flag syntax element.

Feature 3) As an alternative, a flag indicating whether deblocking is enabled for pictures within the coded layer video sequence (CLVS) may be signaled through the SPS, and another flag indicating whether deblocking is enabled for pictures referring to the PPS may be signaled through the PPS.

a) A flag signaled through the SPS may be expressed in the form of sps_deblocking_enabled_flag syntax element, and the flag signaled through the PPS may be expressed in the form of pps_deblocking_enabled_flag syntax element.

b) If the value of the sps_deblocking_enabled_flag syntax element is 0, the value of the pps_deblocking_enabled_flag syntax element of all PPSs referring to the SPS may be set to 0.

Feature 4) As another alternative, signaling of the deblocking_filter_override_enabled_flag syntax element in the PPS may be completely removed; instead, the dbf_info_in_ph_flag syntax element may always be signaled based on the case in which the deblocking_filter_override_control_present_flag syntax element is true. Additionally, deblocking flags and offsets may be signaled via the PH or SH.

Feature 5) As yet another alternative, signaling of the deblocking_filter_override_enabled_flag syntax element in the PPS is removed, but the dpf_info_in_ph_flag syntax element may still be signaled. Feature 5 differs from Feature 4 in that the dpf_info_in_ph_flag syntax element may be signaled regardless of the value of the deblocking_filter_override_control_present_flag syntax element.

Feature 6) As still another alternative, while maintaining the signaling of the pps_deblocking_override_enabled_ flag syntax element in the PPS, the signaling of the ph_deblocking_filter_override_flag syntax element and the slice_deblocking_filter_override_flag syntax element may be removed. In other words, according to at least part of the features above, the deblocking parameters at the PH level are signaled based on the value of the pps_deblocking_override_enabled_flag syntax element and the value of the ph_deblocking_filter_override_flag syntax element; according to Feature 6, deblocking parameters may be signaled at the PH level regardless of the ph_deblocking_filter_override_flag syntax element. Also, according to at least part of the features above, the deblocking parameters are signaled at the SH level based on the value of the pps_deblocking_override_enabled_flag syntax element and the value of the ph_deblocking_filter_override_flag syntax element; according to Feature 6, however, deblocking parameters may be signaled at the SH level regardless of the slice_deblocking_filter_override_flag syntax element.

Feature 7) As another simplification method, deblocking control information may be signaled in the SPS instead of the PPS.

Feature 8) As yet still another alternative, signaling of deblocking offsets in the PPS may be removed, and only the deblocking offsets may be signaled only in the PH or SH.

Figure 11:
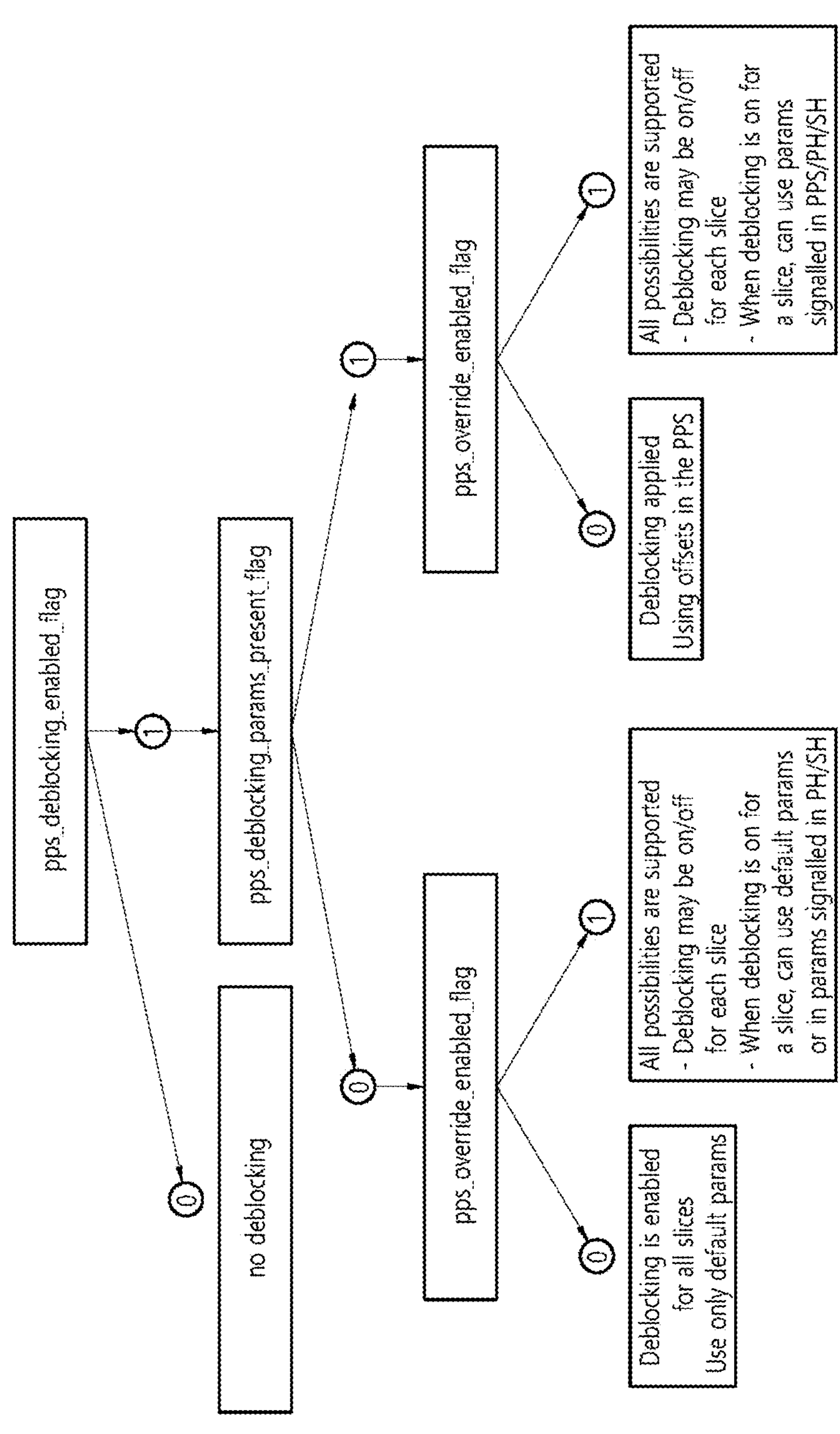
FIG. 11 illustrates a deblocking filtering process according to one embodiment of the present disclosure.

FIG. 11 illustrates a deblocking filtering process according to one embodiment of the present disclosure.

Referring to FIG. 11, deblocking filter enabled flag information for determining whether deblocking filtering is enabled for a slice referring to the PPS may be signaled through the PPS. For example, (PPS) deblocking filter enabled flag information may be expressed in the form of pps_deblocking_enabled_flag syntax element. The pps_deblocking_enabled_flag syntax element may be used interchangeably with the deblocking_filter_enabled_flag syntax element.

If the value of the pps_deblocking_enabled_flag syntax element is 0, deblocking filtering may not be performed. When the value of the pps_deblocking_enabled_flag syntax element is 1, deblocking filter override enabled flag information and deblocking filter parameter present flag may be signaled through the PPS. For example, the deblocking filter override enabled flag information may be expressed in the form of deblocking_filter_override_enabled_flag syntax element. The deblocking_filter_override_enabled_flag syntax element may be used interchangeably with the pps_override_enabled_flag syntax element. For example, the deblocking filter parameter present flag may be expressed in the form of pps_deblocking_filter_params_present_flag syntax element.

When the value of the pps_deblocking_filter_params_present_flag syntax element is 1, deblocking filter parameters may be present in the PPS. In other words, deblocking filter parameter information signaled through the PPS may be used to perform deblocking filtering on a slice.

Also, deblocking filtering may be performed in the PH or SH, which is a lower level, according to the value of the deblocking_filter_override_enabled_flag syntax element.

More specifically, if the value of the deblocking_filter_override_enabled_flag syntax element is 0, deblocking filtering may be performed at the PPS level. In this case, only the deblocking filter parameter information signaled through the PPS may be used for performing the deblocking filtering.

When the value of the deblocking_filter_override_enabled_flag syntax element is 1, the deblocking filter parameter information may be signaled through the PH or SH. In other words, to perform deblocking filtering on a slice, deblocking filter parameter information signaled through the PPS and deblocking parameter information signaled through the PH or SH may be used.

To summarize, when the value of the pps_deblocking_filter_params_present_flag syntax element is 1, and the value of the deblocking_filter_override_enabled_flag syntax element is 0, the deblocking filter parameter information may be signaled only through the PPS. Accordingly, deblocking filtering may be performed using only the deblocking filter parameter information signaled through the PPS. When the value of the pps_deblocking_filter_params_present_flag syntax element is 1, and the value of the deblocking_filter_override_enabled_flag syntax element is 1, the deblocking filter parameter information may be signaled through the PPS and the PH or SH. Accordingly, deblocking filtering may be performed using the deblocking filter parameter information signaled in the PPS and the deblocking filter parameter information signaled through the PH or SH.

Unlike the case above, when the value of the pps_deblocking_filter_params_present_flag syntax element is 0, deblocking filter parameter information may not exist in the PPS. In this case, a predetermined default value may be used for the deblocking filter parameter information. However, deblocking filtering in the PH or SH, which is at a lower level, may be performed according to the value of the deblocking_filter_override_enabled_flag syntax element.

More specifically, when the value of the deblocking_filter_override_enabled_flag syntax element is 0, deblocking filtering for a slice may be performed using a default value of the deblocking filter parameter information. On the other hand, when the value of the deblocking_filter_override_enabled_flag syntax element is 1, deblocking filter parameter information may be signaled through the PH or SH. In other words, to perform deblocking filtering on a slice, deblocking parameter information signaled based on the default value of the parameter information through the PH or SH may be used.

To summarize, when the value of the pps_deblocking_filter_params_present_flag syntax element is 0, and the value of the deblocking_filter_override_enabled_flag syntax element is 0, deblocking filtering on a slice may be performed using only the default value of the parameter information. When the value of the pps_deblocking_filter_params_present_flag syntax element is 0, and the value of the deblocking_filter_override_enabled_flag syntax element is 1, the deblocking filter parameters may be signaled through the PH or SH. Accordingly, deblocking filtering may be performed using the default value of the parameter information and deblocking filter parameter information signaled through the PH or SH.

In what follows, a signaling process of the deblocking filter parameter information according to the present disclosure will be described in detail with reference to a syntax structure.

According to one embodiment of the present disclosure, image information may include deblocking filter parameter information present in a picture. The image information may include a sequence parameter set (SPS), a picture parameter set (PPS), a picture header (PH), and a slice header (SH); deblocking filter parameter information may be signaled through all or part of the SPS, PPS, PH, and SH. In this case, image information and deblocking filter parameter information may be signaled as follows.

The image information may include a deblocking filter enabled flag. For example, the deblocking filter enabled flag may be related to whether deblocking is enabled for slices referring to the PPS. In other words, the deblocking filter enabled flag may specify/indicate whether deblocking is enabled for slices referring to the PPS.

For example, the deblocking filter enabled flag may be expressed in the form of the deblocking_filter_enabled_flag syntax element. For example, the deblocking_filter_enabled_flag syntax element may specify whether deblocking is enabled for slices referring to the PPS.

The image information may include a deblocking filter override enabled flag. For example, the deblocking filter override enabled flag may be related to whether the override of the deblocking filter is enabled in the PH or SH. In other words, the deblocking filter override enabled flag may specify/indicate whether the override of the deblocking filter is enabled in the PH or SH.

For example, the deblocking filter override enabled flag may be expressed in the form of the deblocking_filter_override_enabled_flag syntax element. For example, the deblocking_filter_override_enabled_flag syntax element may specify whether the override of a deblocking filter is enabled in the PH or SH.

The image information may include a deblocking filter parameter present flag. The deblocking filter parameter present flag may be related to whether deblocking filter offsets exist in the PPS. In other words, the deblocking filter parameter present flag may specify/indicate whether PPS deblocking filter parameter information, i.e., deblocking filter offsets, exists in the PPS.

For example, the deblocking filter parameter present flag may be expressed in the form of the pps_deblocking_filter_params_present_flag syntax element. For example, the pps_deblocking_filter_params_present_flag syntax element may specify whether deblocking filter offsets exist in the PPS.

The deblocking filter parameter information may include PPS deblocking filter parameter information. For example, the PPS deblocking filter parameter information may be related to the deblocking offset information signaled through the PPS. In other words, the PPS deblocking filter parameter information may include parameter information related to the luma component and parameter information related to the chroma component. The parameter information related to the luma component may include parameter information related to the beta offset of the luma component and parameter information related to the tc offset of the luma component. The parameter information related to the chroma component may include parameter information related to the beta offset (cb beta offset and cr beta offset) of the chroma component and parameter information related to the tc offset (cb tc offset and cr tc offset) of the chroma component.

For example, parameter information related to the beta offset of the luma component may be expressed in the form of the pps_beta_offset_div2 syntax element. The value of the pps_beta_offset_div2 syntax element*2 may specify the default deblocking parameter offset of beta applied to the luma component of a slice referring to the PPS.

For example, parameter information related to the tc offset of the luma component may be expressed in the form of the pps_tc_offset_div2 syntax element. The value of the pps_tc_offset_div2 syntax element*2 may specify the default deblocking parameter offset of tc applied to the luma component of a slice referring to the PPS.

For example, parameter information related to the beta offset of the cb component may be expressed in the form of the pps_cb_beta_offset_div2 syntax element. The value of the pps_cb_beta_offset_div2 syntax element*2 may specify the default deblocking parameter offset of beta applied to the cb component of a slice referring to the PPS.

For example, parameter information related to the tc offset of the cb component may be expressed in the form of the pps_cb_tc_offset_div2 syntax element. The value of the pps_cb_tc_offset_div2 syntax element*2 may specify the default deblocking parameter offset of tc applied to the cb component of a slice referring to the PPS.

For example, parameter information related to the beta offset of the cr component may be expressed in the form of the pps_cr_beta_offset_div2 syntax element. The value of the pps_cr_beta_offset_div2 syntax element*2 may specify the default deblocking parameter offset of beta applied to the cr component of a slice referring to the PPS.

For example, parameter information related to the tc offset of the cr component may be expressed in the form of the pps_cr_tc_offset_div2 syntax element. The value of the pps_cr_tc_offset_div2 syntax element*2 may specify the default deblocking parameter offset of tc applied to the cr component of a slice referring to the PPS.

The image information may include a PH deblocking filter information flag. For example, the PH deblocking filter information flag may be related to whether deblocking filter information exists in the PH. In other words, the PH deblocking filter information flag may specify/indicate whether deblocking filter information exists in the PH syntax structure.

For example, the PH deblocking filter information flag may be expressed in the form of dbf_info_in_ph_flag syntax element. For example, the dbf_info_in_ph_flag syntax element may specify whether deblocking filter information exists in the PH.

For example, the picture parameter set (PPS) according to one embodiment may include the syntax of Table 7 below. The syntax of Table 7 below may be a part of the PPS.

TABLE 7

| | Descriptor |
|---|---|
| pic_parameter_set_rbsp( ) { | |
| pps_pic_parameter_set_id | ue(v) |
| ... | |
| deblocking_filter_enabled_flag | u(1) |
| if( deblocking_filter_enabled_flag ) { | |
| deblocking_filter_override_enabled_flag | u(1) |
| pps_deblocking_filter_params_present_flag | u(1) |
| if( pps_deblocking_filter_params_present_flag ) { | |
| pps_beta_offset_div2 | se(v) |
| pps_tc_offset_div2 | se(v) |
| pps_cb_beta_offset_div2 | se(v) |
| pps_cb_tc_offset_div2 | se(v) |
| pps_cr_beta_offset_div2 | se(v) |
| pps_cr_tc_offset_div2 | se(v) |
| } | |
| } | |
| if( deblocking_filter_override_enabled_flag ) | |
| dbf_info_in_ph_flag | u(1) |
| ... | |
| } | |

The semantics of the syntax elements included in the syntax of Table 7 may be expressed, for example, as shown in Table 8 below.

TABLE 8

| |
|---|
| pps_pic_parameter_set_id indentifies the PPS for reference by other syntax elements. |
| deblocking_filter_enabled_flag equal to 1 specifies that deblocking may be enabled for all slices referring to the PPS. deblocking filter enabled flag equal to 0 specifies that deblocking is not applied to the slices referring to the PPS. |
| deblocking_filter_override_enabled_flag equal to 1 specifies the presence of ph_deblocking_filter_override_flag in the PHs referring to the PPS or slice deblocking filter override flag in the slice headers referring to the PPS. deblocking_filter_override_enabled_flag equal to 0 specifies the absence of ph_deblocking_filter_override_flag in PHs referring to the PPS or slice_deblocking_filter_override_flag in slice headers referring to the PPS. When not present, the value of deblocking_filter_override_enabled_flag is inferred to be equal to 0. |
| pps_deblocking_filter_params_present_flag equal to 1 specifies that deblocking filter offsets are present in the PPs. pps deblocking filter params present flag equal to 0 specifies that the deblocking parameters are not present in the PPs. When not present, the value of pps_deblocking_filter_params_present_flag is inferred to be equal to 0. |
| pps_beta_offset_div2 and pps_tc_offset_div2 specify the default deblocking parameter offsets for β and tC (divided by 2) that are applied to the luma component for slices referring to the PPS, unless the default deblocking parameter offsets are overridden by the deblocking parameter offsets present in the picture headers or the slice headers of the slices referring to the PPS. The values of pps_beta_offset_div2 and pps_tc_offset_div2 shall both be in the range of −12 to 12, inclusive. When not present, the values of pps_beta_offset_div2 and pps_tc_offset_div2 are both inferred to be equal to 0. |
| pps_cb_beta_offset_div2 and pps_cb_tc_offset_div2 specify the default deblocking parameter offsets for β and tC (divided by 2) that are applied to the Cb component for slices referring to the PPS, unless the default deblocking parameter offsets are overridden by the deblocking parameter offsets present in the picture headers or the slice headers of the slices referring to the PPS. The values of pps_cb_beta_offset_div2 and pps_cb_tc_offset_div2 shall both be in the range of −12 to 12, inclusive. When not present, the values of pps_cb_beta_offset_div2 and pps cb tc offset div2 are both inferred to be equal to 0. |
| pps_cr_beta_offset_div2 and pps_cr_tc_offset_div2 specify the default deblocking parameter offsets for β and tC (divided by 2) that are applied to the Cr component for slices referring to the PPS, unless the default deblocking parameter offsets are overridden by the deblocking parameter offsets present in the picture headers or the slice headers of the slices referring to the PPS. The values of pps_cr_beta_offset_div2 and pps_cr_tc_offset_div2 shall both be in the range of −12 to 12, inclusive. When not present, the values of pps_cr_beta_offset_div2 and pps_cr_tc_offset_div2 are both inferred to be equal to 0. |
| dbf_info_in_ph_flag equal to 1 specifies that deblocking filter information is present in the PH syntax structure and not present in slice headers referring to the PPS that do not contain a PH syntax structure. dbf info in ph flag equal to 0 specifies that deblocking filter information is not present in the PH syntax structure and may be present in slice headers referring to the PPS that do not contain a PH syntax structure. When not present, the value of dbf info in ph flag is inferred to be equal to 0. |

According to one embodiment, when the value of the deblocking filter enabled flag is 1, the deblocking filter override enabled flag, the deblocking filter parameter present flag, the PPS deblocking filter parameter information, and the PH deblocking information flag may be signaled by being included in the PPS. On the other hand, when the value of the deblocking filter enabled flag is 0, the deblocking filter override enabled flag, the deblocking filter parameter present flag, the PPS deblocking filter parameter information, and the PH deblocking filter information flag may not exist in the PPS.

More specifically, when the value of the deblocking filter enabled flag is 1, the deblocking filter override enabled flag and the deblocking filter parameter present flag may be signaled by being included in the PPS. When the value of the deblocking filter enabled flag is 0, the deblocking filter override enabled flag and the deblocking filter parameter present flag may not exist in the PPS.

When the value of the deblocking filter parameter present flag is 1, the PPS deblocking filter parameter information may be signaled by being included in the PPS. When the value of the deblocking filter parameter present flag is 0, the PPS deblocking filter parameter information may not exist in the PPS. When the deblocking filter parameter present flag does not exist in the PPS, namely, when not signaled, the value of the deblocking filter parameter present flag may be derived as 0.

When the deblocking filter override enabled flag is 1, the PH deblocking filter information flag may be signaled by being included in the PPS. When the deblocking filter override enabled flag is 0, the PH deblocking filter information flag may not exist in the PPS. When the deblocking filter override enabled flag does not exist in the PPS, namely, when not signaled, the value of the deblocking filter override enabled flag may be derived as 0.

According to one embodiment, the deblocking filter enabled flag may be used instead of the deblocking filter control present flag, and the deblocking filter parameter present flag may be used instead of the PPS deblocking filter disabled flag.

According to another embodiment of the present disclosure, image information may include a deblocking filter control present flag. For example, the deblocking filter control present flag may be related to whether a syntax element for controlling the deblocking filter exists in the PPS. In other words, the deblocking filter control present flag may specify/indicate whether a syntax element for controlling the deblocking filter exists in the PPS.

For example, the deblocking filter control present flag may be expressed in the form of deblocking_filter_control_present_flag syntax element. For example, the deblocking_filter_control_present_flag syntax element may specify whether a syntax element for controlling a deblocking filter exists in the PPS.

The image information may include a PH deblocking filter information flag. For example, the PH deblocking filter information flag may be related to whether deblocking filter information exists in the PH. In other words, the PH deblocking filter information flag may specify/indicate whether deblocking filter information exists in the PH syntax structure.

For example, the PH deblocking filter information flag may be expressed in the form of dbf_info_in_ph_flag syntax element. For example, the dbf_info_in_ph_flag syntax element may specify whether deblocking filter information exists in the PH.

The image information may include a PPS deblocking filter disabled flag. The PPS deblocking filter disabled flag may be related to whether a deblocking filter is not applied to a slice referring to the PPS. In other words, the PPS deblocking filter disabled flag may specify/indicate whether a deblocking filter is not applied to a slice referring to the PPS.

For example, the PPS deblocking filter disabled flag may be expressed in the form of pps_deblocking_filter_disabled_flag syntax element. For example, the pps_deblocking_filter_disabled_flag syntax element may specify whether a deblocking filter is not applied to a slice referring to the PPS.

The deblocking filter parameter information may include the PPS deblocking filter parameter information. Specific details related to the PPS deblocking filter parameter information are the same as those given to the one embodiment described above.

The image information may include a PH deblocking filter override flag. For example, the PH deblocking filter override flag may be related to whether PH deblocking filter parameter information exists in the PH. In other words, the PH deblocking filter override flag may specify/indicate whether the PH deblocking filter parameter information exists in the PH.

For example, the PH deblocking filter override flag may be expressed in the form of ph_deblocking_filter_override_flag syntax element. For example, the ph_deblocking_filter_override_flag syntax element may specify whether PH deblocking filter parameter information exists in the PH.

The image information may include a PH deblocking filter disabled flag. The PH deblocking filter disabled flag may be related to whether a deblocking filter is not applied to a slice related to the PH. In other words, the PH deblocking filter disabled flag may specify/indicate whether a deblocking filter is not applied to a slice related to the PH.

For example, the PH deblocking filter disabled flag may be expressed in the form of ph_deblocking_filter_disabled_flag syntax element. For example, the ph_deblocking_filter_disabled_flag syntax element may specify whether a deblocking filter is not applied to a slice related to the PH.

The deblocking filter parameter information may include PH deblocking filter parameter information. For example, the PH deblocking filter parameter information may be related to the deblocking offset information signaled through the PH. In other words, the PH deblocking filter parameter information may include parameter information related to the luma component and parameter information related to the chroma component. The parameter information related to the luma component may include parameter information related to the beta offset of the luma component and parameter information related to the tc offset of the luma component. The parameter information related to the chroma component may include parameter information related to the beta offset (cb beta offset and cr beta offset) of the chroma component and parameter information related to the tc offset (cb tc offset and cr tc offset) of the chroma component.

For example, parameter information related to the beta offset of the luma component may be expressed in the form of the ph_beta_offset_div2 syntax element. The value of the ph_beta_offset_div2 syntax element*2 may specify the deblocking parameter offset of beta applied to the luma component of a slice referring to the PH.

For example, parameter information related to the tc offset of the luma component may be expressed in the form of the ph_tc_offset_div2 syntax element. The value of the ph_t- c_offset_div2 syntax element*2 may specify the deblocking parameter offset of tc applied to the luma component of a slice referring to the PH.

For example, parameter information related to the beta offset of the cb component may be expressed in the form of the ph_cb_beta_offset_div2 syntax element. The value of the ph_cb_beta_offset_div2 syntax element*2 may specify the deblocking parameter offset of beta applied to the cb component of a slice referring to the PH.

For example, parameter information related to the tc offset of the cb component may be expressed in the form of the ph_cb_tc_offset_div2 syntax element. The value of the ph_cb_tc_offset_div2 syntax element*2 may specify the deblocking parameter offset of tc applied to the cb component of a slice referring to the PH.

For example, parameter information related to the beta offset of the cr component may be expressed in the form of the ph_cr_beta_offset_div2 syntax element. The value of the ph_cr_beta_offset_div2 syntax element*2 may specify the deblocking parameter offset of beta applied to the cr component of a slice referring to the PH.

For example, parameter information related to the tc offset of the cr component may be expressed in the form of ph_cr_tc_offset_div2 syntax element. The value of the ph_cr_tc_offset_div2 syntax element*2 may specify the deblocking parameter offset of tc applied to the cr component of a slice related to the PH.

The deblocking filter parameter information may include an SH deblocking filter override flag. For example, the SH deblocking filter override flag may be related to whether SH deblocking filter parameter information exists in the SH. In other words, the SH deblocking filter override flag may specify/indicate whether SH deblocking filter parameter information exists in the SH.

For example, the SH deblocking filter override flag may be expressed in the form of slice_deblocking_filter_override_flag syntax element. For example, the slice_deblocking_filter_override_flag syntax element may specify whether the SH deblocking filter override flag exists in SH deblocking filter parameter information.

The image information may include an SH deblocking filter disabled flag. The SH deblocking filter disabled flag may be related to whether a deblocking filter is not applied to the current slice. In other words, the SH deblocking filter disabled flag may specify/indicate whether a deblocking filter is not applied to the current slice.

For example, the SH deblocking filter disabled flag may be expressed in the form of slice_deblocking_filter_disabled_flag syntax element. For example, the slice_deblocking_filter_disabled_flag syntax element may specify whether a deblocking filter is not applied to the current slice.

The deblocking filter parameter information may include SH deblocking filter parameter information. For example, the SH deblocking filter parameter information may be related to the deblocking offset information signaled through the SH. In other words, the SH deblocking filter parameter information may include parameter information related to the luma component and parameter information related to the chroma component. The parameter information related to the luma component may include parameter information related to the beta offset of the luma component and parameter information related to the tc offset of the luma component. The parameter information related to the chroma component may include parameter information related to the beta offset (cb beta offset and cr beta offset) of the chroma component and parameter information related to the tc offset (cb tc offset and cr tc offset) of the chroma component.

For example, parameter information related to the beta offset of the luma component may be expressed in the form of the slice_beta_offset_div2 syntax element. The value of the slice_beta_offset_div2 syntax element*2 may specify the deblocking parameter offset of beta applied to the luma component of a current slice.

For example, parameter information related to the tc offset of the luma component may be expressed in the form of the slice_tc_offset_div2 syntax element. The value of the slice_tc_offset_div2 syntax element*2 may specify the deblocking parameter offset of tc applied to the luma component of a current slice.

For example, parameter information related to the beta offset of the cb component may be expressed in the form of the slice_cb_beta_offset_div2 syntax element. The value of the slice_cb_beta_offset_div2 syntax element*2 may specify the deblocking parameter offset of beta applied to the cb component of a current slice.

For example, parameter information related to the tc offset of the cb component may be expressed in the form of the slice_cb_tc_offset_div2 syntax element. The value of the slice_cb_tc_offset_div2 syntax element*2 may specify the deblocking parameter offset of tc applied to the cb component of a current slice.

For example, parameter information related to the beta offset of the cr component may be expressed in the form of the slice_cr_beta_offset_div2 syntax element. The value of the slice_cr_beta_offset_div2 syntax element*2 may specify the deblocking parameter offset of beta applied to the cr component of a current slice.

For example, parameter information related to the tc offset of the cr component may be expressed in the form of the slice_cr_tc_offset_div2 syntax element. The value of the slice_cr_tc_offset_div2 syntax element*2 may specify the deblocking parameter offset of tc applied to the cr component of a current slice.

For example, the PPS according to one embodiment may include the syntax of Table 9 below. The syntax of Table 9 below may be a part of the PPS.

TABLE 9

| | Descriptor |
|---|---|
| pic_parameter_set_rbsp( ) { | |
| pps_pic_parameter_set_id | ue(v) |
| ... | |
| deblocking_filter_control_present_flag | u(1) |
| if( deblocking_filter_control_present_flag ) { | |
| dbf_info_in_ph_flag | u(1) |
| pps_deblocking_filter_disabled_flag | u(1) |
| if( !pps_deblocking_filter_disabled_flag ) { | |
| pps_beta_offset_div2 | se(v) |
| pps_tc_offset_div2 | se(v) |
| pps_cb_beta_offset_div2 | se(v) |
| pps_cb_tc_offset_div2 | se(v) |
| pps_cr_beta_offset_div2 | se(v) |
| pps_cr_tc_offset_div2 | se(v) |
| } | |
| } | |
| ... | |
| } | |

The semantics of the syntax elements included in the syntax of Table 9 may be expressed, for example, as shown in Table 10 below.

TABLE 10

| |
|---|
| deblocking_filter_control_present_flag equal to 1 specifies the presence of deblocking filter control syntax elements in the PPS. deblocking filter control present flag equal to 0 specifies the absence of deblocking filter control syntax elements in the PPS. |
| pps_deblocking_filter_disabled_flag equal to 1 specifies that the operation of deblocking filter is not applied for slices referring to the PPS in which slice deblocking filter disabled flag is not present. |
| pps_deblocking_filter_disabled_flag equal to 0 specifies that the operation of the deblocking filter is applied for slices referring to the PPS in which slice_deblocking_filter_disabled_flag is not present. When not present, the value of pps_deblocking_filter_disabled_flag is inferred to be equal to 0. |
| pps_beta_offset_div2 and pps_tc_offset_div2 specify the default deblocking parameter offsets for β and tC (divided by 2) that are applied to the luma component for slices referring to the PPS, unless the default deblocking parameter offsets are overridden by the deblocking parameter offsets present in the picture headers or the slice headers of the slices referring to the PPS. The values of pps_beta_offset_div2 and pps_tc_offset_div2 shall both be in the range of −12 to 12, inclusive. When not present, the values of pps_beta_offset_div2 and pps_tc_offset_div2 are both inferred to be equal to 0. |
| pps_cb_beta_offset_div2 and pps_cb_tc_offset_div2 specify the default deblocking parameter offsets for β and tC (divided by 2) that are applied to the Cb component for slices referring to the PPS, unless the default deblocking parameter offsets are overridden by the deblocking parameter offsets present in the picture headers or the slice headers of the slices referring to the PPS. The values of pps_cb_beta_offset_div2 and pps_cb_tc_offset_div2 shall both be in the range of −12 to 12, inclusive. When not present, the values of pps_cb_beta_offset_div2 and pps_cb_tc_offset_div2 are both inferred to be equal to 0. |
| pps_cr_beta_offset_div2 and pps_cr_tc_offset_div2 specify the default deblocking parameter offsets for β and tC (divided by 2) that are applied to the Cr component for slices referring to the PPS, unless the default deblocking parameter offsets are overridden by the deblocking parameter offsets present in the picture headers or the slice headers of the slices referring to the PPS. The values of pps_cr_beta_offset_div2 and pps_cr_tc_offset_div2 shall both be in the range of −12 to 12, inclusive. When not present, the values of pps_cr_beta_offset_div2 and pps cr tc offset div2 are both inferred to be equal to 0. |
| dbf_info_in_ph_flag equal to 1 specifies that deblocking filter information is present in the PH syntax structure and not present in slice headers referring to the PPS that do not contain a PH syntax structure. dbf_info_in_ph_flag equal to 0 specifies that deblocking filter information is not present in the PH syntax structure and may be present in the slice headers referring to the PPS that do not contain a PH syntax structure. When not present, the value of dbf info in ph flag is inferred to be equal to 0. |

According to one embodiment, when the value of the deblocking filter control present flag is 1, the PH deblocking filter information flag, the PPS deblocking filter disabled flag, and the PPS deblocking filter parameter information may be signaled by being included in the PPS. On the other hand, when the value of the deblocking filter control present flag is 0, the PH deblocking filter information flag, the PPS deblocking filter disabled flag, and the PPS deblocking filter parameter information may not exist in the PPS.

More specifically, when the value of the deblocking filter control present flag is 1, the PH deblocking filter information flag and the PPS deblocking filter disabled flag may be signaled by being included in the PPS. When the value of the deblocking filter control present flag is 0, the PH deblocking filter information flag and the PPS deblocking filter disabled flag may not exist in the PPS. When the PH deblocking filter information flag does not exist in the PSS, the value of the PH deblocking filter information flag may be derived as 0. When the PPS deblocking filter disabled flag does not exist in the PPS, the value of the PPS deblocking filter disabled flag may be derived as 0.

When the value of the PPS deblocking filter disabled flag is 0, the PPS deblocking filter parameter information may be signaled by being included in the PPS. When the value of the PPS deblocking filter disabled flag is 1, the PPS deblocking filter parameter information may not exist in the PPS.

For example, the PH according to one embodiment may include the syntax of Table 11 below. The syntax of Table 11 below may be a part of the PH.

TABLE 11

| | Descriptor |
|---|---|
| picture_header_structure( ) { | |
| ... | |
| if( deblocking_filter_control_present_flag && dbf_info_ph_flag ) { | |
| ph_deblocking_filter_override_flag | u(1) |
| if( ph_deblocking_filter_override_flag ) { | |
| ph_deblocking_filter_disabled_flag | u(1) |
| if( !ph_deblocking_filter_disabled_flag ) { | |
| ph_beta_offset_div2 | se(v) |
| ph_tc_offset_div2 | se(v) |
| ph_cb_beta_offset_div2 | se(v) |
| ph_cb_tc_offset_div2 | se(v) |
| ph_cr_beta_offset_div2 | se(v) |
| ph_cr_tc_offset_div2 | se(v) |
| } | |
| } | |
| } | |

The semantics of the syntax elements included in the syntax of Table 11 may be expressed, for example, as shown in Table 12 below.

TABLE 12

| |
|---|
| ph_deblocking_filter_override_flag equal to 1 specifies the deblocking parameters are present in the PH. ph deblocking filter override flag equal to 0 specifies that deblocking parameters are not present in the PH. When not present, the value of ph_deblocking_filter_override_flag is inferred to be equal to 0. |
| ph_deblocking_filter_disabled_flag equal to 1 specifies that the operation of deblocking filter is not applied for the slices associated with the PH. ph deblocking filter disabled flag equal to 0 specifies that the operation of the deblocking filter is applied for the slices associated with the PH. When ph_deblocking_filter_disabled_flag is not present, it is inferred to be equal to pps_deblocking_filter_disabled_flag. |

TABLE 12-continued

| |
|---|
| ph_beta_offset_div2 and ph_tc_offset_div2 specify the deblocking parameter offsets for β and tC (divided by 2) that are applied to the luma component for the slices associated with the PH. The values of ph beta offset div2 and ph_tc_offset_div2 shall both be in the range of −12 to 12, inclusive. When not present, the values of ph_beta_offset_div2 and ph_tc_offset_div2 are inferred to be equal to pps_beta_offset_div2 and pps_tc_offset_div2, respectively. |
| ph_cb_beta_offset_div2 and ph_cb_tc_offset_div2 specify the deblocking parameter offsets for β and tC (divided by 2) that are applied to the Cb component for the slices associated with the PH. The values of ph_cb_beta_offset_div2 and ph_cb_tc_offset_div2 shall both be in the range of −12 to 12, inclusive. When not present, the values of ph_cb_beta_offset_div2 and ph_cb_tc_offset_div2 are inferred to be equal to pps cb beta offset div2 and pps cb tc offset div2, respectively. |
| ph_cr_beta_offset_div2 and ph_cr_tc_offset_div2 specify the deblocking parameter offsets for β and tC (divided by 2) that are applied to the Cr component for the slices associated with the PH. The values of ph_cr_beta_offset_div2 and ph_cr_tc_offset_div2 shall both be in the range of −12 to 12, inclusive. When not present, the values of ph_cr_beta_offset_div2 and ph_cr_tc_offset_div2 are inferred to be equal to pps cr beta offset div2 and pps cr tc offset div2, respectively. |

According to one embodiment, when the value of the deblocking filter control present flag is 1, and the value of the PH deblocking filter information flag is 1, the PH deblocking filter override flag and the PH deblocking filter disabled flag may be signaled by being included in the PH may be included and signaled. On the other hand, when the value of the deblocking filter control present flag is 0 or the value of the PH deblocking filter information flag is 0, the PH deblocking filter override flag and the PH deblocking filter disabled flag may not exist in the PH.

More specifically, when the value of the deblocking filter control present flag is 1, and the value of the PH deblocking filter information flag is 1, the PH deblocking filter override flag may be signaled by being included in the PH. When the value of the deblocking filter control present flag is 0, or the value of the PH deblocking filter information flag is 0, the PH deblocking filter override flag may not exist in the PH. When the PH deblocking filter override flag does not exist in the PH, the value of the PH deblocking filter override flag may be derived as 0.

When the value of the PH deblocking filter override flag is 1, the PH deblocking filter disabled flag may be signaled by being included in the PH. When the value of the PH deblocking filter override flag is 0, the PH deblocking filter disabled flag may not exist in the PH. When the PH deblocking filter disabled flag does not exist in the PH, the value of the PH deblocking filter disabled flag may be derived as the same as that of the PPS deblocking filter disabled flag.

When the value of the PH deblocking filter disabled flag is 0, PH deblocking filter parameter information may be signaled by being included in the PH. When the value of the PH deblocking filter disabled flag is 1, the PH deblocking filter parameter information may not exist in the PH.

For example, the SH according to one embodiment may include the syntax of Table 13 below. The syntax of Table 13 below may be a part of the SH.

TABLE 13

| | Descriptor |
|---|---|
| slice_header( ) { | |
| ... | |
| if( deblocking_filter_control_present_flag && !dbf_info_in_ph_flag ) | |
| slice_deblocking_filter_override_flag | u(1) |
| if( sice_deblocking_filter_override_flag ) { | |
| slice_deblocking_filter_disabled_flag | u(1) |
| if( !slice_deblocking_filter_disabled_flag ) { | |
| slice_beta_offset_div2 | se(v) |
| slice_tc_offset_div2 | se(v) |
| slice_cb_beta_offset_div2 | se(v) |
| slice_cb_tc_offset_div2 | se(v) |
| slice_cr_beta_offset_div2 | se(v) |
| slice_cr_tc_offset_div2 | se(v) |
| } | |
| } | |
| ... | |
| } | |

The semantics of the syntax elements included in the syntax of Table 13 may be expressed, for example, as shown in Table 14 below.

TABLE 14

| |
|---|
| slice_deblocking_filter_override_flag equal to 1 specifies that deblocking parameters are present in the slice header. slice deblocking filter override flag equal to 0 specifies that deblocking parameters are not present in the slice header. When not present, the value of slice_deblocking_filter_override_flag is inferred to be equal to ph_deblocking_filter_override_flag. |
| slice_deblocking_filter_disabled_flag equal to 1 specifies that the operation of deblocking filter is not applied for the current slice. slice deblocking filter disabled flag equal to 0 specifies that the operation of the deblocking filter is applied for the current slice. When slice_deblocking_filter_disabled_flag is not present, it is inferred to be equal to ph_deblocking_filter_disabled_flag. |
| slice_beta_offset_div2 and slice_tc_offset_div2 specify the deblocking parameter offsets for β and tC (divided by 2) that are applied to the luma component for the current slice. The values of slice beta offset div2 and slice_tc_offset_div2 shall both be in the range of −12 to 12, inclusive. When not present, the values of slice_beta_offset_div2 and slice_tc_offset_div2 are inferred to be equal to ph_beta_offset_div2 and ph_tc_offset_div2, respectively. |
| slice_cb_beta_offset_div2 and slice_cb_tc_offset_div2 specify the deblocking parameter offsets for β and tC (divided by 2) that are applied to the Cb component for the current slice. The values of slice cb beta offset div2 and slice_cb_tc_offset_div2 shall both be in the range of −12 to 12, inclusive. When not present, the value of slice_cb_beta_offset_div2 and slice_cb_tc_offset_div2 are inferred to be equal to ph_cb_beta_offset_div2 and ph cb tc offset div2, respectively. |
| slice_cb_beta_offset_div2 and slice_cb_tc_offset_div2 specify the deblocking parameter offsets for β and tC |

TABLE 14-continued

| |
|---|
| (divided by 2) that are applied to the Cr component for the current slice. The values of slice cr beta offset div2 and slice_cr_tc_offset_div2 shall both be in the range of −12 to 12, inclusive. When not present, the values of slice_cr_beta_offset_div2 and slice_cr_tc_offset_div2 are inferred to be equal to ph_cr_beta_offset_div2 and ph cr tc offset div2, respectively. |

According to one embodiment, when the value of the deblocking filter control present flag is 1, and the value of the PH deblocking filter information flag is 0, the SH deblocking filter override flag and the SH deblocking filter disabled flag may be signaled by being included in the SH. On the other hand, when the value of the deblocking filter control present flag is 0, or the value of the PH deblocking filter information flag is 1, the SH deblocking filter override flag and the SH deblocking filter disabled flag may not exist in the SH. When the PH deblocking filter information flag does not exist in the PH, the value of the PH deblocking filter information flag may be derived as 0.

More specifically, when the value of the deblocking filter control present flag is 1, and the value of the PH deblocking filter information flag is 0, the SH deblocking filter override flag may be signaled by being included in the SH. When the value of the deblocking filter control present flag is 0, or the value of the PH deblocking filter information flag is 1, the SH deblocking filter override flag may not exist in the SH. When the SH deblocking filter override flag does not exist in the SH, the value of the SH deblocking filter override flag may be derived as the same as that of the PH deblocking filter override flag.

When the value of the SH deblocking filter override flag is 1, the SH deblocking filter disabled flag may be signaled by being included in the SH. When the value of the SH deblocking filter override flag is 0, the SH deblocking filter disabled flag may not exist in the SH. When the SH deblocking filter disabled flag does not exist in the SH, it may be derived as the same as that of the PH deblocking filter disabled flag.

When the value of the SH deblocking filter disabled flag is 0, the SH deblocking filter parameter information may be signaled by being included in the SH. When the value of the SH deblocking filter disabled flag is 1, the SH deblocking filter parameter information may not exist in the SH.

According to one embodiment, the deblocking filter override enabled flag may not be signaled through the PPS. Also, the one embodiment may signal the PH deblocking filter information flag through the PPS based on the value of the deblocking filter control present flag. Therefore, according to the one embodiment, since there is no need to signal the deblocking filter override enabled flag, the amount of data may be reduced, thereby improving coding efficiency.

According to the one embodiment, whether the deblocking filter parameter is signaled in the PH or SH may be determined based on the value of the deblocking filter control presence flag. Therefore, according to the one embodiment, since there is no need to signal the deblocking filter override enabled flag, the amount of data may be reduced, thereby improving coding efficiency.

According to another one embodiment of the present disclosure, the image information may include an SPS deblocking enabled flag. For example, the SPS deblocking enabled flag may be related to whether deblocking filtering is applied to a coded layer video sequence (CLVS) referring to an SPS. In other words, the SPS deblocking enabled flag may specify/indicate whether deblocking filtering is applied to the CLVS referring to the SPS.

For example, the SPS deblocking enabled flag may be expressed in the form of sps_deblocking_enabled_flag syntax element. For example, the sps_deblocking_enabled_flag syntax element may specify whether deblocking filtering is applied to the CLVS referring to the SPS.

The image information may include a PPS deblocking enabled flag. For example, the PPS deblocking enabled flag may be related to whether deblocking filtering is applied to slices referring to the PPS. In other words, the PPS deblocking enabled flag may specify/indicate whether deblocking filtering is applied to slices referring to the PPS.

For example, the PPS deblocking enabled flag may be expressed in the form of pps_deblocking_enabled_flag syntax element. For example, the pps_deblocking_enabled_flag syntax element may specify whether deblocking filtering is applied to slices referring to the PPS.

For example, the SPS according to one embodiment may include the syntax of Table 15 below. The syntax of Table 15 below may be a part of the SPS.

TABLE 15

| | Descriptor |
|---|---|
| sps_parameter_set_rbsp( ) { | |
| ... | |
| sps_deblocking_enabled_flag | u(1) |
| ... | |
| } | |

The semantics of the syntax elements included in the syntax of Table 15 may be expressed, for example, as shown in Table 16 below.

TABLE 16

| |
|---|
| sps_deblocking_enabled_flag equal to 1 specifies that deblocking operations may be enabled for CLVS referring to the SPS. sps deblocking enabled flag equal to 0 specifies that deblocking operations may not enabled for the CLVS referring to the SPS. |

For example, the PPS according to one embodiment may include the syntax of Table 17 below. The syntax of Table 17 below may be a part of the PPS.

TABLE 17

| | Descriptor |
|---|---|
| pic_parameter_set_rbsp( ) { | |
| pps_pic_parameter_set_id | ue(v) |
| ... | |
| pps_deblocking_enabled_flag | u(1) |
| ... | |
| } | |

The semantics of the syntax elements included in the syntax of Table 17 may be expressed, for example, as shown in Table 18 below.

TABLE 18

| |
|---|
| pps_deblocking_enabled_flag equal to 1 specifies that deblocking operations is enabled for all the slices that refer to the PPS. pps deblocking enabled flag equal to 0 specifies that deblocking operations is not enabled for all the slices that refer to the PPS. What sps_deblocking_enabled_flag is equal to 0, pps_ deblocking enabled flag shall be equal to 0. |

According to the one embodiment, the SPS deblocking enabled flag may be signaled by being included in the SPS. If the value of the SPS deblocking enabled flag is 1, deblocking filtering may be enabled for the CLVS referring to the SPS. When the value of the SPS deblocking enabled flag is 0, deblocking filtering may not be enabled for the CLVS referring to the SPS.

According to the one embodiment, the PPS deblocking enabled flag may be signaled by being included in the PPS. If the value of the PPS deblocking enabled flag is 1, deblocking filtering may be enabled for slices referring to the PPS. If the value of the PPS deblocking enabled flag is 0, deblocking filtering may not be enabled for slices referring to the PPS. When the value of the SPS deblocking enabled flag is 0, the value of the PPS deblocking enabled flag in the PPS referring to the SPS may be 0. In other words, when deblocking filtering is not enabled in the SPS, which is an upper level, deblocking filtering may not be enabled for slices referring to the PPS that refers to the SPS.

According to the one embodiment, whether to perform deblocking filtering is primarily determined at the SPS level and is secondarily determined at the PPS level. More specifically, if deblocking filtering is not enabled in the SPS, which is at the upper level, deblocking filtering in the PPS, which is at the lower level, may be limited so that the deblocking filtering is not enabled. Therefore, according to the one embodiment, since deblocking filtering is commonly controlled at the upper level, the amount of data may be reduced, thereby improving coding efficiency.

According to another embodiment of the present disclosure, image information may include a deblocking filter control present flag, a PPS deblocking filter disabled flag, a PH deblocking filter information flag, a PH deblocking filter override flag, a PH deblocking filter disabled flag, an SH deblocking filter disabled flag, and an SH deblocking filter override flag; deblocking filter parameter information may include a PPS deblocking filter parameter information, a PH deblocking filter parameter information, and an SH deblocking filter parameter information.

For example, the PPS according to the embodiment above may include the syntax of Table 19 below. The syntax of Table 19 below may be a part of the PPS.

TABLE 19

| | Descriptor |
|---|---|
| pic_parameter_set_rbsp( ) { | |
| pps_pic_parameter_set_id | ue(v) |
| ... | |
| deblocking_filter_control_present_flag | u(1) |
| if( deblocking_filter_control_present_flag ) { | |
| pps_deblocking_filter_disabled_flag | u(1) |
| if( !pps_deblocking_filter_disabled_flag ) { | |
| pps_beta_offset_div2 | se(v) |
| pps_tc_offset_div2 | se(v) |
| pps_cb_beta_offset_div2 | se(v) |
| pps_cb_tc_offset_div2 | se(v) |
| pps_cr_beta_offset_div2 | se(v) |
| pps_cr_tc_offset_div2 | se(v) |
| } | |
| } | |

TABLE 19-continued

| | Descriptor |
|---|---|
| dbf_info_in_ph_flag | u(1) |
| ... | |
| } | |

The semantics of the syntax elements included in the syntax of Table 19 is the same, for example, as described with reference to Table 10.

According to the embodiment above, the deblocking filter control present flag and the PH deblocking filter information flag may be signaled by being included in the PPS.

When the value of the deblocking filter control present flag is 1, the PPS deblocking filter disabled flag and the PPS deblocking filter parameter information may be signaled by being included in the PPS. On the other hand, when the value of the deblocking filter control present flag is 0, the PPS deblocking filter disabled flag and the PPS deblocking filter parameter information may not exist in the PPS.

More specifically, when the value of the deblocking filter control present flag is 1, the PPS deblocking filter disabled flag may be signaled by being included in the PPS. When the value of the deblocking filter control present flag is 0, the PPS deblocking filter disabled flag may not exist in the PPS. When the PPS deblocking filter disabled flag does not exist in the PPS, the value of the PPS deblocking filter disabled flag may be derived as 0.

When the value of the PPS deblocking filter disabled flag is 0, PPS deblocking filter parameter information may be signaled by being included in the PPS. When the value of the PPS deblocking filter disabled flag is 1, the PPS deblocking filter parameter information may not exist in the PPS.

According to the embodiment above, unlike the embodiment described with reference to Table 9, the PH deblocking filter information flag may be signaled regardless of the value of the deblocking filter control present flag. More specifically, according to the embodiment described with reference to Table 9, the PH deblocking filter information flag may be signaled by being included in the PPS when the value of the deblocking filter control present flag is 1; however, according to the embodiment above, the PH deblocking filter information flag may be signaled by being included in the PPS regardless of the value of the deblocking filter control present flag.

For example, the PH according to the embodiment above may include the syntax of Table 20 below. The syntax of Table 20 below may be a part of the PH.

TABLE 20

| | Descriptor |
|---|---|
| picture_header_structure( ) { | |
| ... | |
| if( deblocking_filter_control_present_flag ) { | |
| if( dbf_info_ph_flag ) { | |
| ph_deblocking_filter_override_flag | u(1) |
| if( ph_deblocking_filter_override_flag ) { | |
| ph_deblocking_filter_disabled_flag | u(1) |

TABLE 20-continued

| | Descriptor |
|---|---|
| if( !ph_deblocking_filter_disabled_flag ) { | |
| ph_beta_offset_div2 | se(v) |
| ph_tc_offset_div2 | se(v) |
| ph_cb_beta_offset_div2 | se(v) |
| ph_cb_tc_offset_div2 | se(v) |
| ph_cr_beta_offset_div2 | se(v) |
| ph_cr_tc_offset_div2 | se(v) |
| } | |
| } | |
| } | |
| } | |

The semantics of the syntax elements included in the syntax of Table 20 is the same, for example, as described with reference to Table 10.

According to the embodiment above, when the value of the deblocking filter control present flag is 1, and the value of the PH deblocking filter information flag is 1, the PH deblocking filter override flag and the PH deblocking filter disabled flag may be signaled by being included in the PH. On the other hand, when the value of the deblocking filter control present flag is 0, or the value of the PH deblocking filter information flag is 0, the PH deblocking filter override flag and the PH deblocking filter disabled flag may not exist in the PH. When the PH deblocking filter information flag does not exist in the PH, the value of the PH deblocking filter information flag may be derived as 0.

More specifically, when the value of the deblocking filter control present flag is 1, and the value of the PH deblocking filter information flag is 1, the PH deblocking filter override flag may be signaled by being included in the PH. When the value of the deblocking filter control present flag is 0, or the value of the PH deblocking filter information flag is 0, the PH deblocking filter override flag may not exist in the PH. When the PH deblocking filter override flag does not exist in the PH, the value of the PH deblocking filter override flag may be derived as 0.

When the value of the PH deblocking filter override flag is 1, the PH deblocking filter disabled flag may be signaled by being included in the PH. When the value of the PH deblocking filter override flag is 0, the PH deblocking filter disabled flag may not exist in the PH. When the PH deblocking filter disabled flag does not exist in the PH, it may be derived as the same as that of the PPS deblocking filter disabled flag.

When the value of the PH deblocking filter override flag is 0, the PH deblocking filter parameter information may be signaled by being included in the PH. When the value of the PH deblocking filter disabled flag is 1, the PH deblocking filter parameter information may not exist in the PH. When the PH deblocking filter disabled flag does not exist in the PH, the value of the PH deblocking filter disabled flag may be derived as the same as that of the PPS deblocking filter disabled flag.

For example, the SH according to the embodiment above may include the syntax of Table 21 below. The syntax of Table 21 below may be a part of the SH.

TABLE 21

| | Descriptor |
|---|---|
| slice_header( ) { | |
| ... | |
| if(deblocking_filter_control_present_flag && !dbf_info_in_ph_flag) | |
| slice_deblocking_filter_override_flag | u(1) |
| if( slice_deblocking_filter_override_flag ) { | |
| slice_deblocking_filter_disabled_flag | u(1) |
| if( !slice_deblocking_filter_disabled_flag ) { | |
| slice_beta_offset_div2 | se(v) |
| slice_tc_offset_div2 | se(v) |
| slice_cb_beta_offset_div2 | se(v) |
| slice_cb_tc_offset_div2 | se(v) |
| slice_cr_beta_offset_div2 | se(v) |
| slice_cr_tc_offset_div2 | se(v) |
| } | |
| } | |
| ... | |
| } | |

The semantics of the syntax elements included in the syntax of Table 21 is the same, for example, as described with reference to Table 14.

According to the embodiment above, when the value of the deblocking filter control present flag is 1, and the value of the PH deblocking filter information flag is 0, the SH deblocking filter override flag and the SH deblocking filter disabled flag may be signaled by being included in the SH. On the other hand, when the value of the deblocking filter control present flag is 0, or the value of the PH deblocking filter information flag is 1, the SH deblocking filter override flag and the SH deblocking filter disabled flag may not exist in the SH. When the PH deblocking filter information flag does not exist in the PH, the value of the PH deblocking filter information flag may be derived as 0.

More specifically, when the value of the deblocking filter control present flag is 1, and the value of the PH deblocking filter information flag is 0, the SH deblocking filter override flag may be signaled by being included in the SH. When the value of the deblocking filter control present flag is 0, or the value of the PH deblocking filter information flag is 1, the SH deblocking filter override flag may not exist in the SH. When the SH deblocking filter override flag does not exist in the SH, the value of the SH deblocking filter override flag may be derived as the same as that of the PH deblocking filter override flag.

When the value of the SH deblocking filter override flag is 1, the SH deblocking filter disabled flag may be signaled by being included in the SH. When the value of the SH deblocking filter override flag is 0, the SH deblocking filter disabled flag may not exist in the SH. When the SH deblocking filter disabled flag does not exist in the SH, it may be derived as the same as that of the PH deblocking filter disabled flag.

When the value of the SH deblocking filter disabled flag is 0, the SH deblocking filter parameter information may be signaled by being included in the SH. When the value of the SH deblocking filter disabled flag is 1, the SH deblocking filter parameter information may not exist in the SH.

In the embodiment above, the deblocking filter override enabled flag may not be signaled through the PPS. Also, according to the embodiment above, the PH deblocking filter information flag may be signaled through the PPS regardless of the value of the PH deblocking filter information flag or the value of the deblocking filter control present flag. Therefore, according to the embodiment above, since it is not needed to signal the deblocking filter override enabled flag, the amount of data may be reduced, thereby improving coding efficiency.

Also, the value of the deblocking filter control present flag determines whether the deblocking filter parameter is signaled in the PH or SH. In other words, according to the embodiment above, since it is not needed to signal the deblocking filter override enabled flag, the amount of data may be reduced, thereby improving coding efficiency.

According to another embodiment of the present disclosure, image information may include a deblocking filter control present flag, a deblocking filter override enabled flag, a PPS deblocking filter disabled flag, a PH deblocking filter information flag, a PH deblocking filter disabled flag, and an SH deblocking filter disabled flag; deblocking filter parameter information may include a PPS deblocking filter parameter information, a PH deblocking filter parameter information, and SH deblocking filter parameter information.

For example, the PPS according to the embodiment above may include the syntax of Table 22 below. The syntax of Table 22 below may be a part of the PPS.

TABLE 22

| | Descriptor |
|---|---|
| pic_parameter_set_rbsp( ) { | |
| pps_pic_parameter_set_id | ue(v) |
| ... | |
| deblocking_filter_control_present_flag | u(1) |
| if( deblocking_filter_control_present_flag ) { | |
| deblocking_filter_override_enabled_flag | u(1) |
| pps_deblocking_filter_disabled_flag | u(1) |
| if( !pps_deblocking_filter_disabled_flag ) { | |
| pps_beta_offset_div2 | se(v) |
| pps_tc_offset_div2 | se(v) |
| pps_cb_beta_offset_div2 | se(v) |
| pps_cb_tc_offset_div2 | se(v) |
| pps_cr_beta_offset_div2 | se(v) |
| pps_cr_tc_offset_div2 | se(v) |
| } | |
| } | |
| if( deblocking_filter_override_enabled_flag ) | |
| dbf_info_in_ph_flag | u(1) |
| ... | |
| } | |

The semantics of the syntax elements included in the syntax of Table 22 may be expressed, for example, as shown in Table 23 below.

TABLE 23

| |
|---|
| deblocking_filter_override_enabled_flag equal to 1 specifies the presence of ph_deblocking_filter_override_flag in the PHs referring to the PPS of slice deblocking filter override flag in the slice headers referring to the PPS. deblocking_filter_override_enabled_flag equal to 0 specifies the absence of ph_deblocking_filter_override_flag in PHs referring to the PPS of slice_deblocking_filter_override_flag in slice headers referring to the PPS. When not present, the value of deblocking filter override enabled flag is inferred to be equal to 0. |

According to the embodiment above, when the value of the deblocking filter control present flag is 1, the deblocking filter override enabled flag, the PPS deblocking filter disabled flag, the PPS deblocking filter parameter information, and the PH deblocking filter information flag may be signaled by being included in the PPS. On the other hand, when the value of the deblocking filter control present flag is 0, the deblocking filter override enabled flag, the PPS deblocking filter disabled flag, the PPS deblocking filter parameter information, and the PH deblocking filter information flag may not exist in the PPS.

More specifically, when the value of the deblocking filter control present flag is 1, the deblocking filter override enabled flag and the PPS deblocking filter disabled flag may be signaled by being included in the PPS. When the value of the deblocking filter control present flag is 0, the deblocking filter override enabled flag and the PPS deblocking filter disabled flag may not exist in the PPS. When the deblocking filter override enabled flag does not exist in the PPS, the value of the deblocking filter override enabled flag may be derived as 0. When the PPS deblocking filter disabled flag does not exist in the PPS, the value of the PPS deblocking filter disabled flag may be derived as 0.

When the value of the PPS deblocking filter disabled flag is 0, PPS deblocking filter parameter information may be signaled by being included in the PPS. When the value of the PPS deblocking filter disabled flag is 1, the PPS deblocking filter parameter information may not exist in the PPS.

When the value of the deblocking filter override enabled flag is 1, the PH deblocking filter information flag may be signaled by being included in the PPS. When the value of the deblocking filter override enabled flag is 0, the PH deblocking filter information flag may not exist in the PPS. When the PH deblocking filter information flag does not exist in the PPS, the value of the PH deblocking filter information flag may be derived as 0.

For example, the PH according to the embodiment above may include the syntax of Table 24 below. The syntax of Table 24 below may be a part of the PH.

TABLE 24

| | Descriptor |
|---|---|
| picture_header_structure( ) { | |
| ... | |
| if( deblocking_filter_override_endabled_flag && dbf_info_in_ph_flag ) { | |
| ph_deblocking_filter_disabled_flag | u(1) |
| if( !ph_deblocking_filter_disabled_flag ) { | |
| ph_beta_offset_div2 | se(v) |
| ph_tc_offset_div2 | se(v) |
| ph_cb_beta_offset_div2 | se(v) |
| ph_cb_tc_offset_div2 | se(v) |
| ph_cr_beta_offset_div2 | se(v) |
| ph_cr_tc_offset_div2 | |
| } | |
| } | |

The semantics of the syntax elements included in the syntax of Table 24 may be expressed, for example, as shown in Table 25 below.

TABLE 25

| |
|---|
| ph_deblocking_filter_disabled_flag equal to 1 specifies that the operation of deblocking filter is not applied for the slices associated with PH. ph deblocking filter disabled flag equal to 0 specifies that the operation of the deblocking filter is applied for the slices associated with PH. When ph_deblocking_filter_disabled_flag is not present, it is inferred to be equal to pps_deblocking_filter_disabled_flag. |
| ph_beta_offset_div2 and ph_tc_offset_div2 specify the deblocking parameter offsets for β and tC (divided by 2) that are applied to the luma component for slices associated with PH. The values of ph beta offset div2 and ph_tc_offset_div2 shall both be in the range of −12 to 12, inclusive. When not present, the values of ph_beta_offset_div2 and ph_tc_offset_div2 are inferred to be equal to pps_beta_offset_div2 and pps_tc_offset_div2, respectively. |
| ph_cb_beta_offset_div2 and ph_cb_tc_offset_div2 specify the deblocking parameter offsets for β and tC (divided by 2) that are applied to the Cb component for slices associated with PH. The values of ph_cb_beta_offset_div2 and ph_cb_tc_offset_div2 shall both be in the range of −12 to 12, inclusive. When not present, the value of ph_cb_beta_offset_div2 and ph_cb_tc_offset_div2 are inferred to be equal to pps cb beta offset div2 and pps cb tc offset div2, respectively. |
| ph_cr_beta_offset_div2 and ph_cr_tc_offset_div2 specify the deblocking parameter offsets for β and tC (divided by 2) that are applied to the Cr component for slices associated with PH. The values of ph_cr_beta_offset_div2 and ph_cr_tc_offset_div2 shall both be in the range of −12 to 12, inclusive. When not present, the values of ph_cr_beta_offset_div2 and ph_cr_tc_offset_div2 are inferred to be equal to pps cr beta offset div2 and pps cr tc offset div2, respectively. |

According to the embodiment above, when the value of the deblocking filter control present flag is 1, and the value of the PH deblocking filter information flag is 1, the PH deblocking filter disabled flag may be signaled by being included in the PH. On the other hand, when the value of the deblocking filter control present flag is 0, or the value of the PH deblocking filter information flag is 0, the PH deblocking filter disabled flag may not exist in the PH.

More specifically, when the value of the deblocking filter control present flag is 1, and the value of the PH deblocking filter information flag is 1, the PH deblocking filter disabled flag may be signaled by being included in the PH. When the value of the deblocking filter control present flag is 0, or the value of the PH deblocking filter information flag is 0, the PH deblocking filter disabled flag may not exist in the PH. When the PH deblocking filter disabled flag does not exist in the PH, the value of the PH deblocking filter disabled flag may be derived as the same as that of the PPS deblocking filter disabled flag.

When the value of the PH deblocking filter disabled flag is 0, PH deblocking filter parameter information may be signaled by being included in the PH. When the value of the PH deblocking filter disabled flag is 1, the PH deblocking filter parameter information may not exist in the PH.

For example, the SH according to the embodiment above may include the syntax of Table 26 below. The syntax of Table 26 below may be a part of the SH.

TABLE 26

| | Descriptor |
|---|---|
| slice_header( ) { | |
| ... | |
| if( deblocking_filter_override_enabled_flag && !dbf_info_in_ph_flag ) { | |
| slice_deblocking_filter_disabled_flag | u(1) |
| if( !slice_deblocking_filter_disabled_flag ) { | |
| slice_beta_offset_div2 | se(v) |
| slice_tc_offset_div2 | se(v) |
| slice_cb_beta_offset_div2 | se(v) |
| slice_cb_tc_offset_div2 | se(v) |
| slice_cr_beta_offset_div2 | se(v) |
| slice_cr_tc_offset_div2 | se(v) |
| } | |
| } | |
| ... | |
| } | |

The semantics of the syntax elements included in the syntax of Table 26 may be expressed, for example, as shown in Table 27 below.

TABLE 27

| |
|---|
| slice_deblocking_filter_disabled_flag equal to 1 specifies that the operation of deblocking filter is not applied for the current slice. slice deblocking filter disabled flag equal to 0 specifies that the operation of the deblocking filter is applied for the current slice. When slice_deblocking_filter_disabled_flag is not present, it is inferred to be equal to ph_deblocking_filter_disabled_flag. |
| slice_beta_offset_div2 and slice_tc_offset_div2 specify the deblocking parameter offsets for β and tC (divided by 2) that are applied to the luma component for the current slice. The values of slice beta offset div2 and slice_tc_offset_div2 shall both be in the range of −12 to 12, inclusive. When not present, the values of slice_beta_offset_div2 and slice_tc_offset_div2 are inferred to be equal to ph_beta_offset_div2 and ph_tc_offset_div2, respectively. |
| slice_cb_beta_offset_div2 and slice_cb_tc_offset_div2 specify the deblocking parameter offsets for β and tC (divided by 2) that are applied to the Cb component for the current slice. The values of slice cb beta offset div2 and slice_cb_tc_offset_div2 shall both be in the range of −12 to 12, inclusive. When not present, the values of slice_cb_beta_offset_div2 and slice_cb_tc_offset_div2 are inferred to be equal to ph_cb_beta_offset_div2 and ph cb tc offset div2, respectively. |
| slice_cb_beta_offset_div2 and slice_cb_tc_offset_div2 specify the deblocking parameter offsets for β and tC (divided by 2) that are applied to the Cr component for the current slice. The values of slice cr beta offset div2 and slice_cr_tc_offset_div2 shall both be in the range of −12 to 12, inclusive. When not present, the values of slice_cr_beta_offset_div2 and slice_cr_tc_offset_div2 are inferred to be equal to ph_cr_beta_offset_div2 and ph cr tc offset div2, respectively. |

According to the embodiment above, when the value of the deblocking filter control present flag is 1, and the value of the PH deblocking filter information flag is 1, the SH deblocking filter disabled flag may be signaled by being included in the SH. On the other hand, when the value of the deblocking filter control present flag is 0, or the value of the PH deblocking filter information flag is 0, the PH deblocking filter disabled flag may not exist in the PH.

More specifically, when the value of the deblocking filter control present flag is 1, and the value of the PH deblocking filter information flag is 0, the SH deblocking filter disabled flag may be signaled by being included in the SH. When the value of the deblocking filter control present flag is 0, or the value of the PH deblocking filter information flag is 1, the SH deblocking filter disabled flag may not exist in the SH. When the SH deblocking filter disabled flag does not exist in the SH, the value of the SH deblocking filter disabled flag may be derived as the same as that of the PH deblocking filter disabled flag.

When the value of the SH deblocking filter disabled flag is 0, the SH deblocking filter parameter information may be signaled by being included in the SH. When the value of the SH deblocking filter disabled flag is 1, the SH deblocking filter parameter information may not exist in the SH.

According to the embodiment above, the PH deblocking filter disabled flag may be signaled by being included in the PH regardless of the value of the PH deblocking filter override flag, or the SH deblocking filter disabled flag may be signaled by being included in the SH regardless of the value of the SH deblocking filter override flag. In other words, according to the embodiment above, signaling of the PH deblocking filter override flag and the SH deblocking filter override flag may be omitted.

More specifically, according to the embodiment above, the PH deblocking filter disabled flag may be signaled through the PH based on the case in which the value of the deblocking filter override enabled flag is 1, and the value of the PH deblocking filter information flag is 1; the SH deblocking filter disabled flag may be signaled through the SH based on the case in which the value of the deblocking filter override enabled flag is 1, and the value of the PH deblocking filter information flag is 0.

Accordingly, according to the embodiment above, since deblocking filtering is performed regardless of the PH deblocking filter override flag or the SH deblocking filter override flag, the amount of data may be reduced, thereby improving coding efficiency.

According to another embodiment of the present disclosure, image information may include a deblocking filter control present flag. For example, the deblocking filter control present flag may be related to whether a syntax element for controlling the deblocking filter exists in the SPS. In other words, the deblocking filter control present flag may specify/indicate whether a syntax element for controlling the deblocking filter exists in the SPS.

For example, the deblocking filter control present flag may be expressed in the form of deblocking_filter_control_present_flag syntax element. For example, the deblocking_filter_control_present_flag syntax element may specify whether a syntax element for controlling a deblocking filter exists in the SPS.

The image information may include a deblocking filter override enabled flag. For example, the deblocking filter override enabled flag may be related to whether a PH deblocking filter override flag exists in the PHs referring to an SPS or whether an SH deblocking filter override flag exists in the SHs referring to an SPS. In other words, the deblocking filter override enabled flag may specify/indicate whether the PH deblocking filter override flag exists in the PHs referring to the SPS or whether the SH deblocking filter override flag exists in the SHs referring to the SPS.

For example, the deblocking filter override enabled flag may be expressed in the form of deblocking_filter_override_enabled_flag syntax element. For example, the deblocking_filter_override_enabled_flag syntax element may specify whether the PH deblocking filter override flag exists in the PHs referring to the SPS or whether the SH deblocking filter override flag exists in the SHs referring to the SPS.

The image information may include an SPS deblocking filter disabled flag. The SPS deblocking filter disabled flag may be related to whether a deblocking filter is not applied to a slice referring to the SPS. In other words, the SPS deblocking filter disabled flag may specify/indicate whether a deblocking filter is not applied to a slice referring to the SPS.

For example, the SPS deblocking filter disabled flag may be expressed in the form of sps_deblocking_filter_disabled_flag syntax element. For example, the sps_deblocking_filter_disabled_flag syntax element may specify whether a deblocking filter is not applied to a slice referring to the SPS.

The deblocking filter parameter information may include SPS deblocking filter parameter information. For example, the SPS deblocking filter parameter information may be related to the deblocking offset information signaled through the SPS. In other words, the SPS deblocking filter parameter information may include parameter information related to the luma component and parameter information related to the chroma component. The parameter information related to the luma component may include parameter information related to the beta offset of the luma component and parameter information related to the tc offset of the luma component. The parameter information related to the chroma component may include parameter information related to the beta offset (cb beta offset and cr beta offset) of the chroma component and parameter information related to the tc offset (cb tc offset and cr tc offset) of the chroma component.

For example, parameter information related to the beta offset of the luma component may be expressed in the form of the sps_beta_offset_div2 syntax element. The value of the sps_beta_offset_div2 syntax element*2 may specify the default deblocking parameter offset of beta applied to the luma component of a slice referring to the SPS.

For example, parameter information related to the tc offset of the luma component may be expressed in the form of the sps_tc_offset_div2 syntax element. The value of the sps_tc_offset_div2 syntax element*2 may specify the default deblocking parameter offset of tc applied to the luma component of a slice referring to the SPS.

For example, parameter information related to the beta offset of the cb component may be expressed in the form of the sps_cb_beta_offset_div2 syntax element. The value of the sps_cb_beta_offset_div2 syntax element*2 may specify the default deblocking parameter offset of beta applied to the cb component of a slice referring to the SPS.

For example, parameter information related to the tc offset of the cb component may be expressed in the form of the sps_cb_tc_offset_div2 syntax element. The value of the sps_cb_tc_offset_div2 syntax element*2 may specify the default deblocking parameter offset of tc applied to the cb component of a slice referring to the SPS.

For example, parameter information related to the beta offset of the cr component may be expressed in the form of the sps_cr_beta_offset_div2 syntax element. The value of the sps_cr_beta_offset_div2 syntax element*2 may specify the default deblocking parameter offset of beta applied to the cr component of a slice referring to the SPS.

For example, parameter information related to the offset of the cr component may be expressed in the form of the sps_cr_to_offset_div2 syntax element. The value of the sps_cr_tc_offset_div2 syntax element*2 may specify the default deblocking parameter offset of tc applied to the cr component of a slice referring to the SPS.

The image information may include a PH deblocking filter information flag. For example, the PH deblocking filter information flag may be related to whether deblocking filter information exists in the PH. In other words, the PH deblocking filter information flag may specify/indicate whether deblocking filter information exists in the PH syntax structure.

For example, the PH deblocking filter information flag may be expressed in the form of dbf_info_in_ph_flag syntax element. For example, the dbf_info_in_ph_flag syntax element may specify whether deblocking filter information exists in the PH.

For example, the SPS according to the embodiment above may include the syntax of Table 28 below. The syntax of Table 28 below may be a part of the SPS.

TABLE 28

| | Descriptor |
|---|---|
| seq_parameter_set_rbsp( ) { | |
| sps_seq_parameter_set_id | u(4) |
| ... | |
| deblocking_filter_control_present_flag | u(1) |
| if( deblocking_filter_control_present_flag ) { | |
| deblocking_filter_override_enabled_flag | u(1) |
| sps_deblocking_filter_disabled_flag | u(1) |
| if( !sps_deblocking_filter_disabled_flag ) { | |
| sps_beta_offset_div2 | se(v) |
| sps_tc_offset_div2 | se(v) |
| sps_cb_beta_offset_div2 | se(v) |
| sps_cb_tc_offset_div2 | se(v) |
| sps_cr_beta_offset_div2 | se(v) |
| sps_cr_tc_offset_div2 | se(v) |
| } | |

TABLE 28-continued

| | Descriptor |
|---|---|
| } | |
| if( deblocking_filter_override_enabled_flag ) | |
| dbf_info_in_ph_flag | u(1) |
| ... | |
| } | |

The semantics of the syntax elements included in the syntax of Table 28 may be expressed, for example, as shown in Table 29 below.

TABLE 29

| |
|---|
| deblocking_filter_control_present_flag equal to 1 specifies the presence of deblocking filter control syntax elements in the SPS. deblocking filter control present flag equal to 0 specifies the absence of deblocking filter control syntax elements in the SPS. |
| deblocking_filter_override_enabled_flag equal to 1 specifies the presence of ph_deblocking_filter_override_flag in the PHs referring to the SPS or slice deblocking filter override flag in the slice headers referring to the SPS. deblocking_filter_override_enabled_flag equal to 0 specifies the absence of ph_deblocking_filter_override_flag in PHs referring to the SPS or slice_deblocking_filter_override_flag in slice headers referring to the SPS. When not present, the value of deblocking_filter_override_enabled_flag is inferred to be equal to 0. |
| sps_deblocking_filter_disabled_flag equal to 1 specifies that the operation of deblocking filter is not applied for slices referring to the SPS in which slice deblocking filter disabled flag is not present. sps_deblocking_filter_disabled_flag equal to 0 specifies that the operation of the deblocking filter is applied for slices referring to the SPS in which slice_deblocking_filter_disabled_flag is not present. When not present, the value of sps_deblocking_filter_disabled_flag is inferred to be equal to 0. |
| sps_beta_offset_div2 and sps_tc_offset_div2 specify the default deblocking parameter offsets for β and tC (divided by 2) that are applied to the luma component for slices referring to the SPS, unless the default deblocking parameter offsets are overridden by the deblocking parameter offsets present in the picture headers or the slice headers of the slices referring to the SPS. The values of sps_beta_offset_div2 and sps_tc_offset_div2 shall both be in the range of −12 to 12, inclusive. When not present, the values of sps_beta_offset_div2 and sps_tc_offset_div2 are both inferred to be equal to 0. |
| sps_cb_beta_offset_div2 and sps_cb_tc_offset_div2 specify the default deblocking parameter offsets for β and tC (divided by 2) that are applied to the Cb component for slices referring to the PPS, unless the default deblocking parameter offsets are overridden by the deblocking parameter offsets present in the picture headers or the slice headers of the slices referring to the PPS. The values of sps_cb_beta_offset_div2 and sps_cb_tc_offset_div2 shall both be in the range of −12 to 12, inclusive. When not present, the values of sps_cb_beta_offset_div2 and sps cb tc offset div2 are both inferred to be equal to 0. |
| sps_cr_beta_offset_div2 and sps_cr_tc_offset_div2 specify the default deblocking parameter offsets for β and tC (divided by 2) that are applied to the Cr component for slices referring to the SPS, unless the default deblocking parameter offsets are overridden by the deblocking parameter offsets present in the picture headers or the slice headers of the slices referring to the SPS. The values of sps_cr_beta_offset_div2 and sps_cr_tc_offset_div2 shall both be in the range of −12 to 12, inclusive. When not present, the values of sps_cr_beta_offset_div2 and sps_cr_tc_offset_div2 are both inferred to be equal to 0. |
| dbf_info_in_ph_flag equal to 1 specifies that deblocking filter information is present in the PH syntax structure and not present in slice headers referring to the SPS that do not contain a PH syntax structure. dbf_info_in_ph_flag equal to 0 specifies that deblocking filter information is not present in the PH syntax structure and may be present in the slice headers referring to the SPS that do not contain a PH syntax structure. When not present, the value of dbf info in ph flag is inferred to be equal to 0. |

According to the embodiment above, when the value of the deblocking filter control present flag is 1, the deblocking filter override enabled flag, the SPS deblocking filter disabled flag, the SPS deblocking filter parameter information, and the PH deblocking filter information flag may be signaled by being included in the SPS. On the other hand, when the value of the deblocking filter control present flag is 0, the deblocking filter override enabled flag, the SPS deblocking filter disabled flag, the SPS deblocking filter parameter information, and the PH deblocking filter information flag may not exist in the SPS.

More specifically, when the value of the deblocking filter control present flag is 1, the deblocking filter override enabled flag and the SPS deblocking filter disabled flag may be signaled by being included in the SPS. When the value of the deblocking filter control present flag is 0, the deblocking filter override enabled flag and the SPS deblocking filter disabled flag may not exist in the SPS. When the deblocking filter override enabled flag does not exist in the SPS, the value of the deblocking filter override enabled flag may be derived as 0. When the SPS deblocking filter disabled flag does not exist in the SPS, the value of the SPS deblocking filter disabled flag may be derived as 0.

When the value of the SPS deblocking filter disabled flag is 0, SPS deblocking filter parameter information may be signaled by being included in the SPS. When the value of the SPS deblocking filter disabled flag is 1, the SPS deblocking filter parameter information may not exist in the SPS.

When the value of the deblocking filter override enabled flag is 1, the PH deblocking filter information flag may be signaled by being included in the SPS. When the value of the deblocking filter override enabled flag is 0, the PH deblocking filter information flag may not exist in the SPS. When the PH deblocking filter information flag does not exist in the SPS, the value of the PH deblocking filter information flag may be derived as 0.

According to the embodiment above, information related to the deblocking filter parameters may be signaled through the SPS and the PH or SH referring to the SPS. Since the amount of data contained in the information related to the deblocking filter parameters may be reduced through the signaling, coding efficiency may be improved.

According to another embodiment of the present disclosure, the image information may include a deblocking filter control present flag, a PH deblocking filter information flag, a PH deblocking filter disabled flag, and an SH deblocking filter disabled flag; the deblocking filter parameter information may include PH deblocking filter parameter information or SH deblocking filter parameter information.

For example, the PPS according to the embodiment above may include the syntax of Table 30 below. The syntax of Table 30 below may be a part of the PPS.

TABLE 30

| | Descriptor |
|---|---|
| pic_paramter_set_rbsp( ) { | |
| pps_pic_parameter_set_id | ue(v) |
| ... | |
| deblocking_filter_control_present_flag | u(1) |
| if( deblocking_filter_control_present_flag ) { | |
| dbf_info_in_ph_flag | u(1) |
| } | |
| ... | |
| } | |

The semantics of the syntax elements included in the syntax of Table 30 may be the same, for example, as described in Table 10.

According to the embodiment above, when the value of the deblocking filter control present flag is 1, the PH deblocking filter information flag may be signaled by being included in the PPS. On the other hand, when the value of the deblocking filter control present flag is 0, the PH deblocking filter information flag may not exist in the PPS.

More specifically, when the value of the deblocking filter control present flag is 1, the PH deblocking filter information flag may be signaled by being included in the PPS. When the value of the deblocking filter control present flag is 0, the PH deblocking filter information flag may not exist in the PPS. When the PH deblocking filter information flag does not exist in the PPS, the value of the PH deblocking filter information flag may be derived as 0.

For example, the PH according to the embodiment above may include the syntax of Table 31 below. The syntax of Table 31 below may be a part of the PH.

TABLE 31

| | Descriptor |
|---|---|
| picture_header_structure( ) { | |
| ... | |
| if( dbf_info_in_ph_flag ) { | |
| ph_deblocking_filter_disabled_flag | u(1) |
| if( !ph_deblocking_filter_disabled_flag ) { | |
| ph_beta_offset_div2 | se(v) |
| ph_tc_offset_div2 | se(v) |
| ph_cb_beta_offset_div2 | se(v) |
| ph_cb_tc_offset_div2 | se(v) |
| ph_cr_beta_offset_div2 | se(v) |
| ph_cr_tc_offset_div2 | se(v) |
| } | |
| } | |
| } | |

The semantics of the syntax elements included in the syntax of Table 31 may be the same, for example, as described in Table 12.

According to the embodiment above, when the value of the PH deblocking filter information flag is 1, the PH deblocking filter disabled flag may be signaled by being included in the PH. On the other hand, when the value of the PH deblocking filter information flag is 0, the PH deblocking filter disabled flag may not exist in the PH. When the PH deblocking filter disabled flag does not exist in the PH, the value of the PH deblocking filter disabled flag may be derived as the same as that of the PPS deblocking filter disabled flag.

When the value of the PH deblocking filter disabled flag is 0, the PH deblocking filter parameter information may be signaled by being included in the PH. When the value of the PH deblocking filter disabled flag is 1, the PH deblocking filter parameter information may not exist in the PH.

TABLE 32

| | Descriptor |
|---|---|
| slice_header( ) { | |
| ... | |
| if( !dbf_info_in_ph_flag ) | |
| slice_deblocking_filter_disabled_flag | u(1) |
| if( !slice_deblocking_filter_disabled_flag ) { | |
| slice_beta_offset_div2 | se(v) |
| slice_tc_offset_div2 | se(v) |
| slice_cb_beta_offset_div2 | se(v) |
| slice_cb_tc_offset_div2 | se(v) |
| slice_cr_beta_offset_div2 | se(v) |
| slice_cr_tc_offset_div2 | se(v) |
| } | |
| } | |
| ... | |
| } | |

The semantics of the syntax elements included in the syntax of Table 32 may be the same, for example, as described in Table 14.

According to the embodiment above, when the value of the PH deblocking filter information flag is 0, the SH deblocking filter disabled flag may be signaled by being included in the SH. On the other hand, when the value of the PH deblocking filter information flag is 1, the SH deblocking filter disabled flag may not exist in the SH. When the SH deblocking filter disabled flag does not exist in the SH, the value of the SH deblocking filter disabled flag may be derived as the same as that of the PH deblocking filter disabled flag.

When the value of the SH deblocking filter disabled flag is 0, SH deblocking filter parameter information may be signaled by being included in the SH. When the value of the SH deblocking filter disabled flag is 1, the SH deblocking filter parameter information may not exist in the SH.

According to the embodiment above, the PPS deblocking filter parameter information may not be signaled through the PPS. In other words, the PPS deblocking filter parameter information may be omitted. According to the embodiment above, the PPS deblocking filter disabled flag may not exist in the PPS, and the PPS deblocking filter parameter information may not exist either. According to the embodiment above, the deblocking filter override enabled flag does not exist in the PPS, and signaling of the PH deblocking filter information flag may be determined based on the value of the deblocking filter control present flag.

According to the embodiment above, signaling of the PH deblocking filter override flag and the SH deblocking filter override flag may be omitted. Also, according to the embodiment above, whether to signal deblocking filter parameter information through the PH or SH may be determined based on the value of the PH deblocking filter information flag.

Therefore, according to the embodiment above, the process of signaling complex data may be simplified, and the amount of data may be reduced, thereby improving coding efficiency.

The following drawings have been created to explain a specific example of the present disclosure. The specific names of devices or specific terms or names (e.g., the names of syntax/syntax elements, etc.) described in the drawings are provided by way of example, so that the technical features of the present disclosure are not limited to the specific names used in the drawings below.

Figure 12:
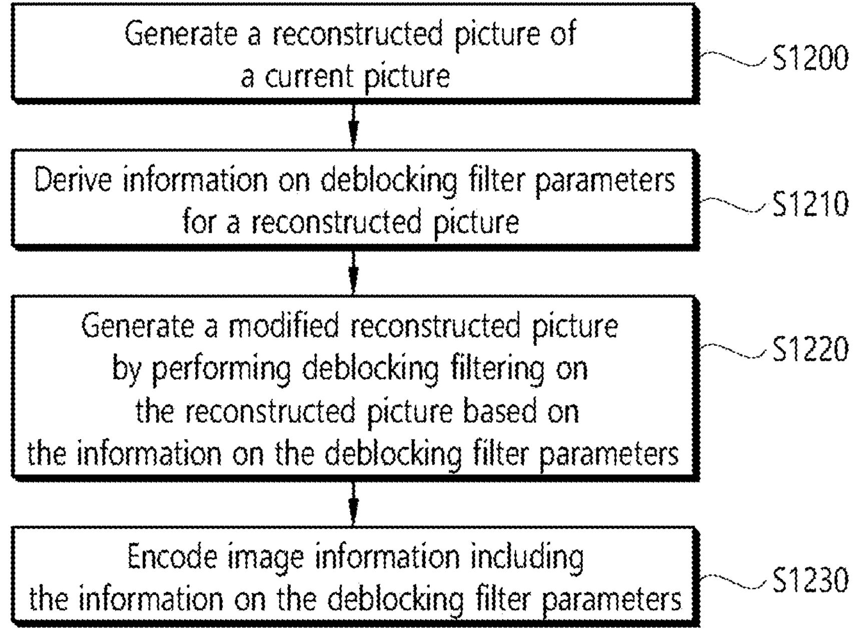
FIGS. 12 and 13 illustrate a deblocking filtering-based video/image encoding method according to an embodiment(s) of the present disclosure and one example of related components.
Figure 13:
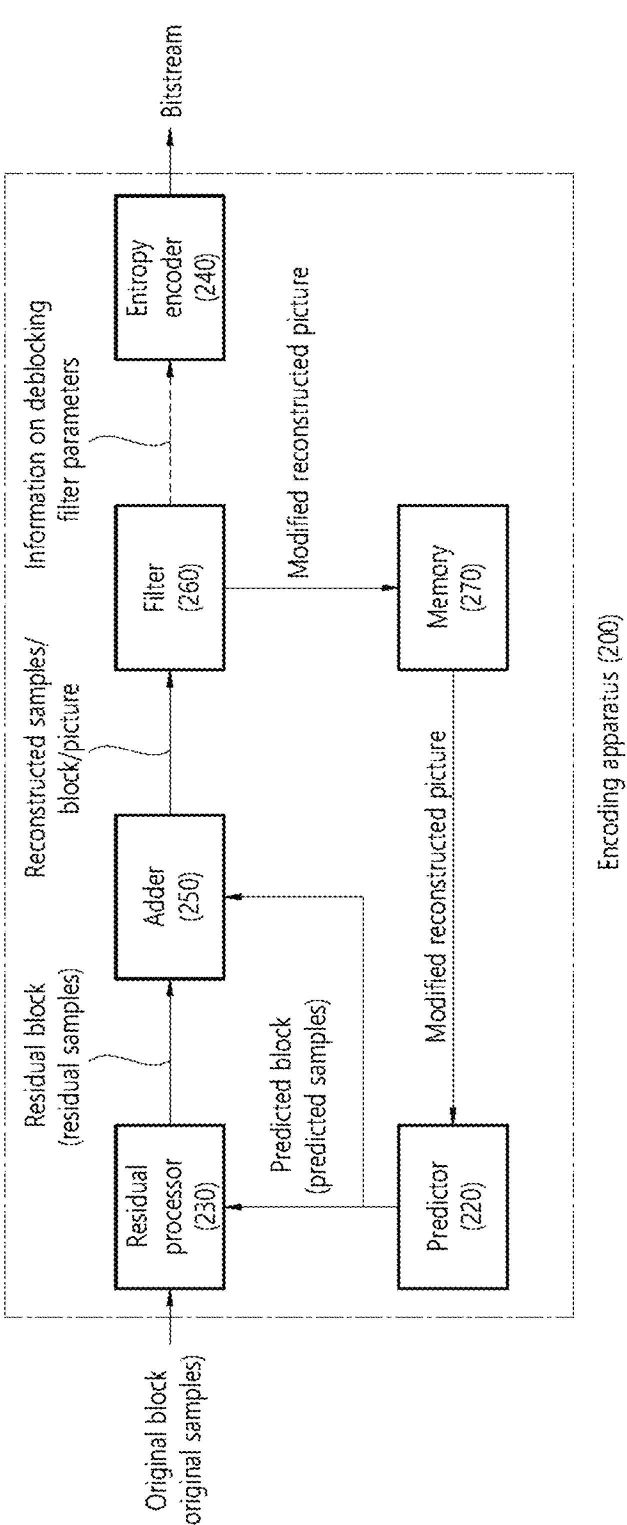

FIGS. 12 and 13 illustrate a deblocking filtering-based video/image encoding method according to an embodiment(s) of the present disclosure and one example of related components.

The method disclosed in FIG. 12 may be performed by the encoding apparatus 200 disclosed in FIG. 2. Specifically, the S1200 step of FIG. 12 may be performed by the adder 250 of the encoding apparatus 200 illustrated in FIG. 2; the S1210 to S1220 steps of FIG. 12 may be performed by the filter 260 of the encoding apparatus 200 disclosed in FIG. 2; and the S1230 step of FIG. 12 may be performed by the entropy encoder 240 of the encoding apparatus 200 disclosed in FIG. 2. Also, the method disclosed in FIG. 12 may be performed by including the embodiments described above. Accordingly, in describing FIG. 12, a detailed description overlapping with those related to the embodiments above will be omitted or simplified.

Referring to FIG. 12, an encoding apparatus may generate a reconstructed picture of a current picture S1200.

As an embodiment, the encoding apparatus may determine whether to perform inter-prediction or intra-prediction on the current block and may determine a specific inter-prediction mode or a specific intra-prediction mode based on an RD cost. According to the determined mode, the encoding apparatus may derive prediction samples for the current block.

Then, the encoding apparatus may generate a reconstructed picture based on the prediction samples of the current block. That is, the encoding apparatus may derive residual samples by subtracting the prediction samples from the original samples with respect to the current block and may generate reconstructed samples based on the residual samples and the prediction samples. The encoding apparatus may generate a reconstructed block based on the reconstructed samples of the current block in the picture and may generate a reconstructed picture including the reconstructed blocks.

Since the encoding apparatus performs an encoding procedure such as prediction, transformation, and reconstruction in units of block, blocking artifacts may occur at the boundary between blocks in a reconstructed picture. Accordingly, the encoding apparatus may apply deblocking filtering to remove the blocking artifacts at the boundary between blocks in the reconstructed picture. To apply deblocking filtering to the reconstructed picture, the encoding apparatus may derive deblocking filter parameter information for the reconstructed picture S1210. Deblocking filter parameter information may be used interchangeably with the information on deblocking filter parameters.

The encoding apparatus may generate a modified reconstructed picture by performing deblocking filtering on the reconstructed picture based on the deblocking filter parameter information S1220.

The encoding apparatus may encode image information including the deblocking filter parameter information S1230. The image information may include a sequence parameter set (SPS), a picture parameter set (PPS), a picture header (PH), and a slice header (SH).

The deblocking filter parameter information may be signaled, for example, using the following methods.

For example, first flag information, second flag information, third flag information, fifth flag information, and the deblocking filter parameter information may be signaled by being included in the SPS or PPS. The deblocking filter parameter information may be related to the deblocking filter parameters. More specifically, the deblocking filter parameter information may include first deblocking filter parameter information and second deblocking filter parameter information. The first deblocking filter parameter information may be signaled through the SPS or PPS. Sixth flag information, seventh flag information, and second deblocking filter parameter information may be signaled by being included in the PH or SH.

The first flag information and the second flag information may be related to the existence of the first deblocking filter parameter information. More specifically, the first flag information may be, for example, the information indicating whether deblocking filtering is enabled. Or, the first flag information may be, for example, the information indicating whether deblocking filtering is disabled. For example, the second flag information may indicate whether the first deblocking filter parameters are signaled through the SPS or PPS. Or, the second flag information may be, for example, the information indicating whether a syntax element related to the control of deblocking filtering exists in the PPS. The third flag information, the sixth flag information, and the seventh flag information may be related to whether the second deblocking filter parameter information exists in the PH or SH. The fifth flag information may be related to whether the third flag information is signaled.

More specifically, the first deblocking filter parameter information may be signaled by being included in at least one of the PPS or SPS based on the first flag information and the second flag information. In some embodiments, the third flag information may be signaled based on the value of the fifth flag information. In some embodiments, the sixth flag information may be signaled based on the values of the first flag information and the third flag information. In some embodiments, the seventh flag information may be signaled based on the value of the sixth flag information. In some embodiments, the second deblocking filter parameter information may be signaled based on the value of the third flag information, the value of the fifth flag information, the value of the sixth flag information, and the value of the seventh flag information.

The first deblocking filter parameter information may correspond to the PPS deblocking filter parameter information. For example, the first deblocking filter parameter information may include pps_beta_offset_div2 syntax element, pps_tc_offset_div2 syntax element, pps_cb_beta_offset_div2 syntax element, pps_cb_tc_offset_div2 syntax element, pps_cr_beta_offset_div2 syntax element, and pps_cr_tc_offset_div2 syntax element.

The first flag information may correspond to, for example, deblocking_filter_enabled_flag syntax element or pps_deblocking_filter_disabled_flag syntax element. The deblocking_filter_enabled_flag syntax element may be used interchangeably with the pps_deblocking_enabled_flag syntax element. The second flag information may correspond to, for example, pps_deblocking_filter_params_present_flag syntax element or deblocking_filter_control_present_flag syntax element. The third flag information may correspond to, for example, dbf_info_in_ph_flag syntax element. The fifth flag information may correspond to deblocking_filter_override_enabled_flag syntax element.

The sixth flag information may correspond to ph_deblocking_filter_override_flag syntax element or slice_deblocking_filter_override_flag syntax element. The seventh flag information may correspond to ph_deblocking_filter_disabled_flag syntax element or slice_deblocking_filter_disabled_flag syntax element.

The second deblocking filter parameter information may correspond to the PH deblocking parameter information or SH deblocking filter parameter information. For example, the second deblocking filter parameter information may include ph_beta_offset_div2 syntax element, ph_tc_offset_div2 syntax element, ph_cb_beta_offset_div2 syntax element, ph_cb_tc_offset_div2 syntax element, ph_cr_beta_offset_div2 syntax element, and ph_cr_tc_offset_div2 syntax element; or slice_beta_offset_div2 syntax element, slice_tc_offset_div2 syntax element, slice_cb_beta_offset_div2 syntax element, slice_cb_tc_offset_div2 syntax element, slice_cr_beta_offset_div2 syntax element, and slice_cr_tc_offset_div2 syntax element.

In some embodiments, signaling of the fifth flag information may be omitted. When signaling of the fifth flag information is omitted, the third flag information may be signaled between the first flag information and the second flag information. More specifically, when the value of the second flag information is 1, the third flag information may be signaled between the first flag information and the second flag information. Also, when the value of the second flag information is 1, and the value of the third flag information is 1, the second deblocking filter parameter information may be signaled through the PH. On the other hand, when the value of the second flag information is 1, and the value of the third flag information is 0, the second deblocking filter parameter information may be signaled through the SH.

In some embodiments, the fourth flag information may be signaled by being included in the SPS. The fourth flag information may be related to whether the deblocking filter is enabled. When the fourth flag information is signaled through the SPS, the first flag information may be signaled through the PPS. When the value of the fourth flag information is 1, the value of the first flag information may have a value of 0 or 1. On the other hand, when the value of the fourth flag information is 0, the value of the first flag information may be limited to 0.

The fourth flag information may correspond to, for example, sps_deblocking_enabled_flag syntax element. When the fourth flag information is signaled by being included in the SPS, the first flag information may correspond to the pps_deblocking_enabled_flag syntax element.

In some embodiments, signaling of the fifth flag information may be omitted. When signaling of the fifth flag information is omitted, the third flag information may be signaled unconditionally. In other words, the third flag information may be signaled regardless of the value of the second flag information or the value of the fifth flag information. Also, when the value of the second flag information is 1, and the value of the third flag information is 1, the second deblocking filter parameter information may be signaled through the PH. On the other hand, when the value of the second flag information is 1, and the value of the third flag information is 0, the second deblocking filter parameter information may be signaled through the SH.

In some embodiments, signaling of the sixth flag information may be omitted. In this case, the seventh flag information may be signaled based on the value of the third flag information and the value of the fifth flag information. The second deblocking filter parameter information may be signaled based on the value of the third flag information, the value of the fifth flag information, and the value of the seventh flag information.

In some embodiments, signaling of the first flag information, the fifth flag information, and the sixth flag information may be omitted.

Figure 14:
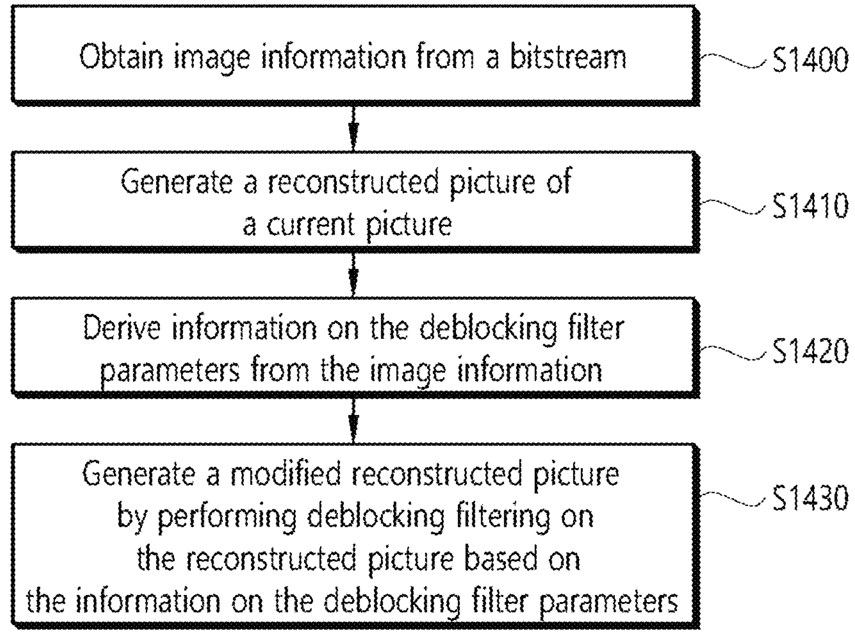
FIGS. 14 and 15 illustrate a deblocking filtering-based video/image encoding method according to an embodiment(s) of the present disclosure and one example of related components.
Figure 15:
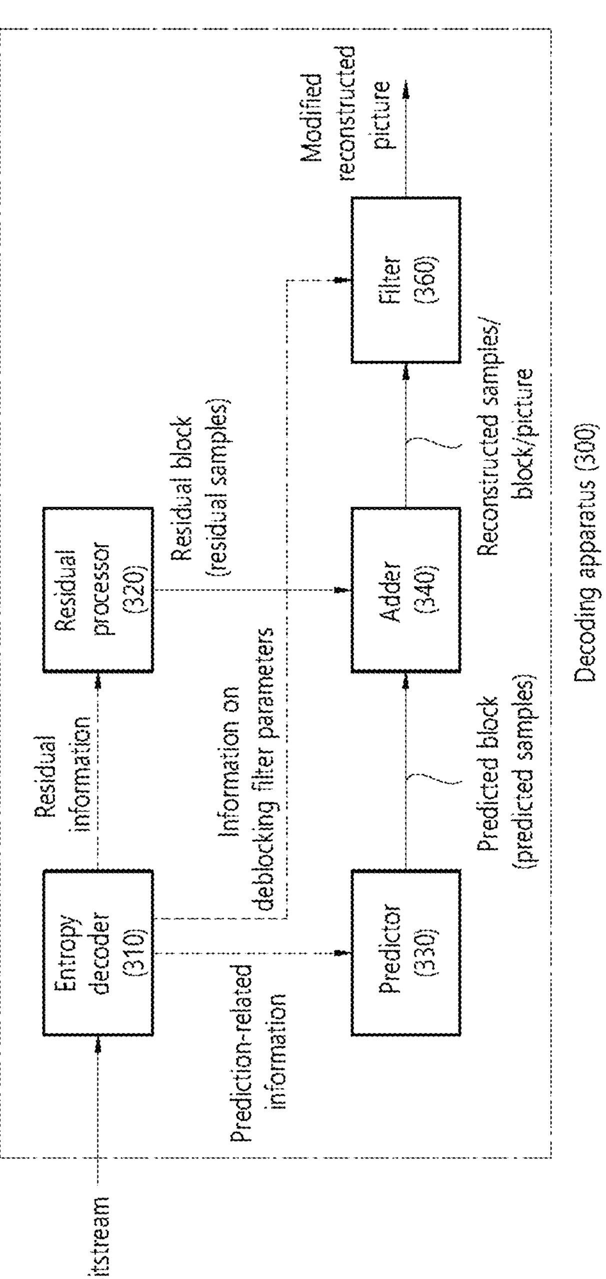

FIGS. 14 and 15 illustrate a deblocking filtering-based video/image decoding method according to an embodiment(s) of the present disclosure and one example of related components.

The method disclosed in FIG. 14 may be performed by the decoding apparatus 300 disclosed in FIG. 3. Specifically, the S1400 step of FIG. 14 may be performed by the entropy decoder 310 of the decoding apparatus 300 illustrated in FIG. 3, the S1410 step of FIG. 14 may be performed by the adder 340 of the decoding apparatus 300 disclosed in FIG. 3. The S1420 to S1430 steps of FIG. 14 may be performed by the filter 350 of the decoding apparatus 300 disclosed in FIG. 3. Also, the method disclosed in FIG. 14 may be performed by including the embodiments described above. Accordingly, in describing FIG. 14, a detailed description overlapping with those related to the embodiments above will be omitted or simplified.

Referring to FIG. 14, the decoding apparatus may obtain image information from a bitstream S1400. As described above, the image information may include a sequence parameter set (SPS), a picture parameter set (PPS), a picture header (PH), and a slice header (SH).

The decoding apparatus may generate a reconstructed picture of a current picture based on the image information S1410. For example, the decoding apparatus may receive image information including prediction-related information on the current block through the bitstream. In this case, the image information may include prediction-related information on the current block. The prediction-related information may include information on an inter prediction mode or an intra prediction mode performed on the current block. In other words, the decoding apparatus may perform inter or intra prediction on the current block based on the prediction-related information received through the bitstream and may derive prediction samples of the current block.

In addition, the decoding apparatus may receive image information including residual information on the current block through the bitstream. In this case, the image information may include residual information on the current block. The residual information may include transform coefficients related to residual samples. The decoding apparatus may derive residual samples (or a residual sample array) of the current block based on the residual information.

The decoding apparatus may generate reconstructed samples based on the prediction samples and the residual samples and may generate a reconstructed block based on the reconstructed samples for the current block in a picture. Then, the decoding apparatus may generate a reconstructed picture including reconstructed blocks.

Since the decoding apparatus performs a decoding procedure such as prediction, transformation, and reconstruction in units of block, blocking artifacts may occur at the boundary between blocks in a reconstructed picture. Accordingly, the decoding apparatus may apply deblocking filtering to remove the blocking artifacts at the boundary between blocks in the reconstructed picture. To apply deblocking filtering to the reconstructed picture, the decoding apparatus may derive deblocking filter parameter information from the image information S1420. Deblocking filter parameter information may be used interchangeably with the information on deblocking filter parameters.

The decoding apparatus may generate a modified reconstructed picture by performing deblocking filtering on the reconstructed picture based on the deblocking filter parameter information S1430.

The deblocking filter parameter information may be signaled through the method described in the embodiments above. Since signaling of the deblocking filter parameter information has been described in detail through the embodiments above, descriptions related to the signaling will be simplified in what follows.

The deblocking filter parameter information may be signaled, for example, using the following methods.

For example, first flag information, second flag information, third flag information, fifth flag information, and the deblocking filter parameter information may be signaled by being included in the SPS or PPS. The deblocking filter parameter information may be related to the deblocking filter parameters. More specifically, the deblocking filter parameter information may include first deblocking filter parameter information and second deblocking filter parameter information. The first deblocking filter parameter information may be signaled through the SPS or PPS. Sixth flag information, seventh flag information, and second deblocking filter parameter information may be signaled by being included in the PH or SH.

The first flag information and the second flag information may be related to the existence of the first deblocking filter parameter information. More specifically, the first flag information may be, for example, the information indicating whether deblocking filtering is enabled. Or, the first flag information may be, for example, the information indicating whether deblocking filtering is disabled. For example, the second flag information may indicate whether the first deblocking filter parameters are signaled through the SPS or PPS. Or, the second flag information may be, for example, the information indicating whether a syntax element related to the control of deblocking filtering exists in the PPS. The third flag information, the sixth flag information, and the seventh flag information may be related to whether the second deblocking filter parameter information exists in the PH or SH. The fifth flag information may be related to whether the third flag information is signaled.

More specifically, the first deblocking filter parameter information may be signaled by being included in at least one of the PPS or SPS based on the first flag information and the second flag information. In some embodiments, the third flag information may be signaled based on the value of the fifth flag information. In some embodiments, the sixth flag information may be signaled based on the values of the first flag information and the third flag information. In some embodiments, the seventh flag information may be signaled based on the value of the sixth flag information. In some embodiments, the second deblocking filter parameter information may be signaled based on the value of the third flag information, the value of the fifth flag information, the value of the sixth flag information, and the value of the seventh flag information.

The first deblocking filter parameter information may correspond to the PPS deblocking filter parameter information. For example, the first deblocking filter parameter information may include pps_beta_offset_div2 syntax element, pps_tc_offset_div2 syntax element, pps_cb_beta_offset_div2 syntax element, pps_cb_tc_offset_div2 syntax element, pps_cr_beta_offset_div2 syntax element, and pps_cr_tc_offset_div2 syntax element.

The first flag information may correspond to, for example, deblocking_filter_enabled_flag syntax element or pps_deblocking_filter_disabled_flag syntax element. The deblocking_filter_enabled_flag syntax element may be used interchangeably with the pps_deblocking_enabled_flag syntax element. The second flag information may correspond to, for example, pps_deblocking_filter_params_present_flag syntax element or deblocking_filter_control_present_flag syntax element. The third flag information may correspond to, for example, dbf_info_in_ph_flag syntax element. The fifth flag information may correspond to deblocking_filter_override_enabled_flag syntax element.

The sixth flag information may correspond to ph_deblocking_filter_override_flag syntax element or slice_deblocking_filter_override_flag syntax element. The seventh flag information may correspond to ph_deblocking_filter_disabled_flag syntax element or slice_deblocking_filter_disabled_flag syntax element.

The second deblocking filter parameter information may correspond to the PH deblocking parameter information or SH deblocking filter parameter information. For example, the second deblocking filter parameter information may include ph_beta_offset_div2 syntax element, ph_tc_offset_div2 syntax element, ph_cb_beta_offset_div2 syntax element, ph_cb_tc_offset_div2 syntax element, ph_cr_beta_offset_div2 syntax element, and ph_cr_tc_offset_div2 syntax element; or slice_beta_offset_div2 syntax element, slice_tc_offset_div2 syntax element, slice_cb_beta_offset_div2 syntax element, slice_cb_tc_offset_div2 syntax element, slice_cr_beta_offset_div2 syntax element, and slice_cr_tc_offset_div2 syntax element.

In some embodiments, signaling of the fifth flag information may be omitted. When signaling of the fifth flag information is omitted, the third flag information may be signaled between the first flag information and the second flag information. More specifically, when the value of the second flag information is 1, the third flag information may be signaled between the first flag information and the second flag information. Also, when the value of the second flag information is 1, and the value of the third flag information is 1, the second deblocking filter parameter information may be signaled through the PH. On the other hand, when the value of the second flag information is 1, and the value of the third flag information is 0, the second deblocking filter parameter information may be signaled through the SH.

In some embodiments, the fourth flag information may be signaled by being included in the SPS. The fourth flag information may be related to whether the deblocking filter is enabled. When the fourth flag information is signaled through the SPS, the first flag information may be signaled through the PPS. When the value of the fourth flag information is 1, the value of the first flag information may have a value of 0 or 1. On the other hand, when the value of the fourth flag information is 0, the value of the first flag information may be limited to 0.

The fourth flag information may correspond to, for example, sps_deblocking_enabled_flag syntax element. When the fourth flag information is signaled by being included in the SPS, the first flag information may correspond to the pps_deblocking_enabled_flag syntax element.

In some embodiments, signaling of the fifth flag information may be omitted. When signaling of the fifth flag information is omitted, the third flag information may be signaled unconditionally. In other words, the third flag information may be signaled regardless of the value of the second flag information or the value of the fifth flag information. Also, when the value of the second flag information is 1, and the value of the third flag information is 1, the second deblocking filter parameter information may be signaled through the PH. On the other hand, when the value of the second flag information is 1, and the value of the third flag information is 0, the second deblocking filter parameter information may be signaled through the SH.

In some embodiments, signaling of the sixth flag information may be omitted. In this case, the seventh flag information may be signaled based on the value of the third flag information and the value of the fifth flag information. The second deblocking filter parameter information may be signaled based on the value of the third flag information, the value of the fifth flag information, and the value of the seventh flag information.

In some embodiments, signaling of the first flag information, the fifth flag information, and the sixth flag information may be omitted.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function parts shown in each drawing may be embodied and performed on a computer, a processor, a microprocessor, a controller or a chip. In this case, information for implementation (ex. information on instructions) or an algorithm may be stored in a digital storage medium.

Furthermore, the decoding apparatus and the encoding apparatus to which this document is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VOD) service provision device, an over the top (OTT) video device, an Internet streaming service provision device, a three-dimensional (3D) video device, a virtual reality (VR) device, an augmented reality (AR) device, a video telephony device, transportation means terminal (e.g., a vehicle (including autonomous vehicle) terminal, an aircraft terminal, and a vessel terminal), and a medical video device, and may be used to process a video signal or a data signal. For example, the over the top (OTT) video device may include a game console, a Blueray player, Internet access TV, a home theater system, a smartphone, a tablet PC, and a digital video recorder (DVR).

Furthermore, the processing method to which this document is applied may be produced in the form of a program executed by a computer, and may be stored in a computer-readable recording medium. Multimedia data having a data structure according to this document may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of this document may be implemented as a computer program product using program code. The program code may be performed by a computer according to an embodiment of this document. The program code may be stored on a carrier readable by a computer.

Figure 16:
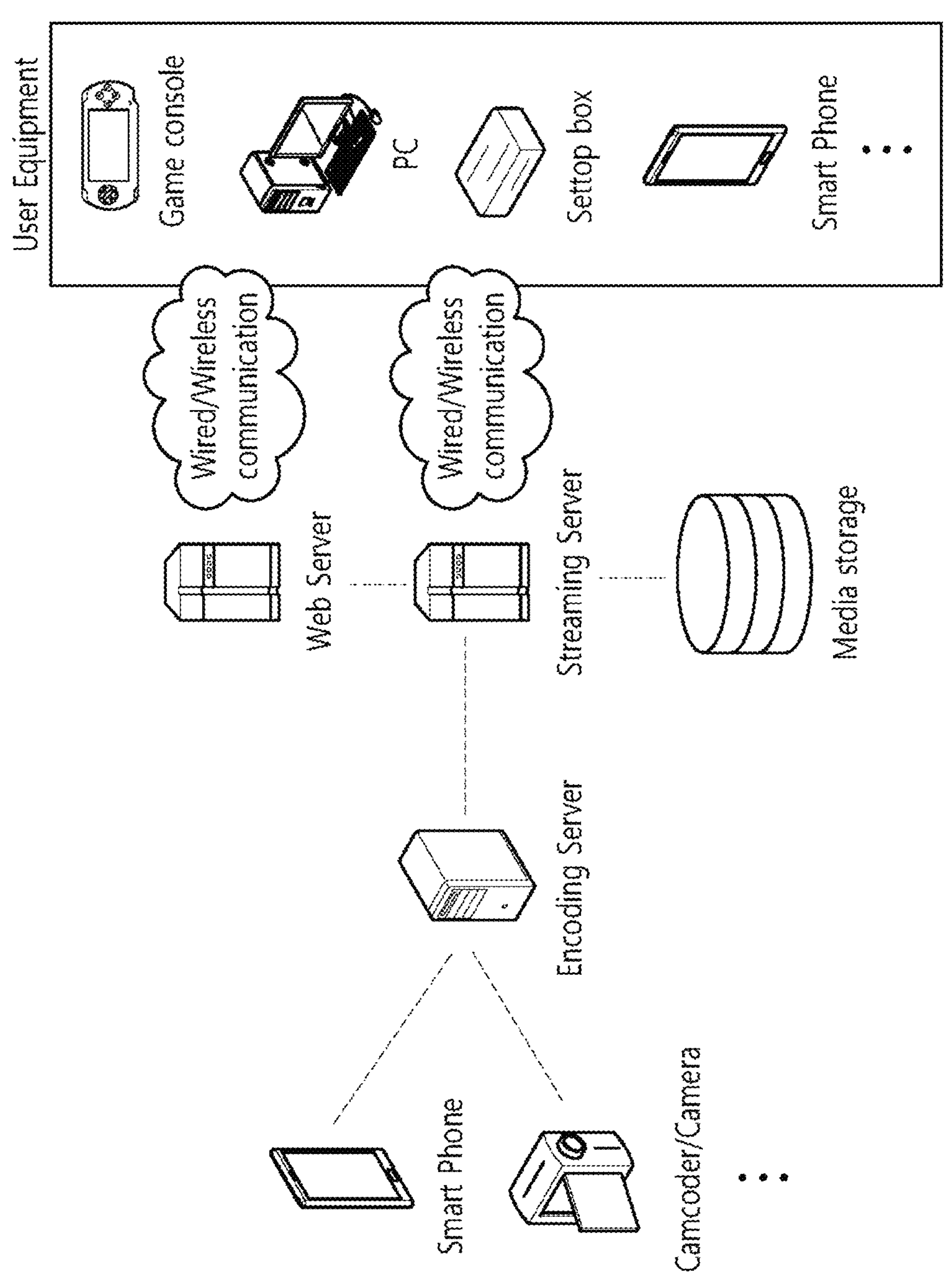
FIG. 16 illustrates an example of a contents streaming system to which the embodiments of the present disclosure may be applied.

FIG. 16 illustrates an example of a content streaming system to which embodiments disclosed in this document may be applied.

Referring to FIG. 16, the content streaming system to which the embodiments of the present document are applied may basically include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. smartwatches, smart glasses, head mounted displays), digital TVs, desktops computer, digital signage, and the like.

Each server in the content streaming system may be operated as a distributed server, in which case data received from each server may be distributed.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claims of the present specification and the technical features of the apparatus claims may be combined to be implemented as an apparatus, and the technical features of the method claims and the technical features of the apparatus claims of the present specification may be combined and implemented as a method.

What is claimed is:

1. A decoding apparatus for an image decoding, the decoding apparatus comprising:

a memory; and at least one processor connected to the memory, the at least one processor configured to:

obtain image information including information related to a deblocking filter through a bitstream;

generate a reconstructed picture of a current picture; and generate a modified reconstructed picture based on the information related to the deblocking filter and the reconstructed picture, wherein the information related to the deblocking filter includes first flag information specifying whether deblocking filter information is present in a Picture Header (PH), wherein whether second flag information related to whether deblocking parameters are present in the PH is included in the PH is determined based on the first flag information, wherein the determination on whether the second flag information is included in the PH is performed in the PH, wherein the determination is performed based only on the first flag information, wherein the first flag information is included in a Picture Parameter Set (PPS), wherein the PH includes information that applies commonly to all slices in a picture, and wherein the PPS includes information that applies commonly to one or more pictures.

2. An encoding apparatus for an image encoding, the encoding apparatus comprising:

a memory; and at least one processor connected to the memory, the at least one processor configured to:

generate a reconstructed picture of a current picture;

generate a modified reconstructed picture based on a deblocking filter and the reconstructed picture, generate information related to the deblocking filter, encode image information including the information related to the deblocking filter, wherein information related to the deblocking filter includes first flag information specifying whether deblocking filter information is present in a Picture Header (PH), wherein whether second flag information related to whether deblocking parameters are present in the PH is included in the PH is configured to be determined based on the first flag information, wherein the determination on whether the second flag information is included in the PH is configured to be performed in the PH, wherein the determination is configured to be performed based only on the first flag information, wherein the first flag information is included in a Picture Parameter Set (PPS), wherein the PH includes information that applies commonly to all slices in a picture, and wherein the PPS includes information that applies commonly to one or more pictures.

3. An apparatus for transmitting data for an image, the apparatus comprising:

at least one processor configured to obtain a bitstream for the image, wherein the bitstream is generated based on generating a reconstructed picture of a current picture, generating a modified reconstructed picture based on a deblocking filter and the reconstructed picture, generating information related to the deblocking filter, encoding image information including the information related to the deblocking filter to generate the bitstream; and a transmitter configured to transmit the data comprising the bitstream, wherein information related to the deblocking filter includes first flag information specifying whether deblocking filter information is present in a Picture Header (PH), wherein whether second flag information related to whether deblocking parameters are present in the PH is included in the PH is configured to be determined based on the first flag information, wherein the determination on whether the second flag information is included in the PH is configured to be performed in the PH, wherein the determination is configured to be performed based only on the first flag information, wherein the first flag information is included in a Picture Parameter Set (PPS), wherein the PH includes information that applies commonly to all slices in a picture, and wherein the PPS includes information that applies commonly to one or more pictures.

* * * * *